United States Patent
Drewelow

(10) Patent No.: US 9,079,785 B2
(45) Date of Patent: Jul. 14, 2015

(54) APPARATUS FOR AERATION OF CONTAMINATED LIQUIDS

(75) Inventor: David S. Drewelow, Escondido, CA (US)

(73) Assignee: Liquid Separation Technologies and Equipment, LLC, Irvine, CA (US)

(*) Notice: Subject to any disclaimer, the term of this patent is extended or adjusted under 35 U.S.C. 154(b) by 0 days.

(21) Appl. No.: 13/356,393

(22) Filed: Jan. 23, 2012

(65) Prior Publication Data

US 2012/0234740 A1 Sep. 20, 2012

Related U.S. Application Data

(63) Continuation of application No. 11/938,199, filed on Nov. 9, 2007, now Pat. No. 8,101,089.

(60) Provisional application No. 60/956,061, filed on Aug. 15, 2007.

(51) Int. Cl.
*B01F 3/04* (2006.01)
*B01D 19/00* (2006.01)
*C02F 1/20* (2006.01)
*C02F 101/32* (2006.01)
*C02F 103/06* (2006.01)

(52) U.S. Cl.
CPC .............. *C02F 1/20* (2013.01); *B01D 19/0005* (2013.01); *B01D 19/0042* (2013.01); *B01F 3/04113* (2013.01); *C02F 2101/322* (2013.01); *C02F 2103/06* (2013.01)

(58) Field of Classification Search
CPC ...... B01D 19/00; B01D 19/0005; B01F 3/04; B01F 3/04099; B01F 3/04106; B01F 3/04113
USPC ............. 261/119.1, 121.1, 123, 126; 210/220
See application file for complete search history.

(56) References Cited

U.S. PATENT DOCUMENTS

| | | |
|---|---|---|
| RE15,866 E | 6/1924 | Elliott |
| 2,013,105 A | 9/1935 | MacKillican |
| 2,195,898 A | 4/1940 | Newton |
| 2,718,275 A | 9/1955 | Banks |
| 2,939,544 A | 6/1960 | Walker et al. |
| 3,285,832 A | 11/1966 | Sephton |
| 3,533,917 A | 10/1970 | Williams |
| 3,898,058 A | 8/1975 | McGill |
| 3,925,208 A | 12/1975 | Yost |
| 4,235,680 A | 11/1980 | Diggs |
| 4,236,973 A | 12/1980 | Robbins |
| 4,343,683 A | 8/1982 | Diggs |
| 4,376,702 A * | 3/1983 | Small ............................ 210/201 |

(Continued)

FOREIGN PATENT DOCUMENTS

| | | |
|---|---|---|
| GB | 2035814 A | 6/1980 |
| JP | 2001-029933 A | 2/2001 |

(Continued)

*Primary Examiner* — Robert A Hopkins
(74) *Attorney, Agent, or Firm* — Knobbe Martens Olson & Bear LLP

(57) ABSTRACT

Water decontamination systems including aerator modules are described herein. Such systems are capable of removing contaminants, including volatile organic compounds, from the water. Certain volatile organic contaminants can be removed at high efficiencies. The systems may be automated to remove the contaminants and produce cleaned water on a continuous basis.

17 Claims, 19 Drawing Sheets

(56) References Cited

U.S. PATENT DOCUMENTS

| | | | |
|---|---|---|---|
| 4,412,924 | A | 11/1983 | Feather |
| 4,444,571 | A | 4/1984 | Matson |
| 4,473,064 | A | 9/1984 | Jacques |
| 4,518,503 | A | 5/1985 | Fermaglich |
| 4,544,488 | A | 10/1985 | O'Brien |
| 4,608,163 | A | 8/1986 | Yohe et al. |
| 4,632,676 | A | 12/1986 | Mosebach et al. |
| 4,659,347 | A | 4/1987 | Schrems |
| 4,663,089 | A | 5/1987 | Lowry et al. |
| 4,670,027 | A | 6/1987 | Becker et al. |
| 4,713,089 | A | 12/1987 | Robbins |
| 4,758,654 | A | 7/1988 | Brod et al. |
| 4,767,543 | A | 8/1988 | Chornet et al. |
| 4,808,319 | A | 2/1989 | McNally et al. |
| 4,830,755 | A | 5/1989 | Hardin |
| 4,842,748 | A | 6/1989 | Agnihotri et al. |
| 4,846,934 | A | 7/1989 | Carberry |
| 4,857,198 | A | 8/1989 | Meidl |
| 4,869,832 | A | 9/1989 | Lamarre |
| 4,892,664 | A | 1/1990 | Miller |
| 4,900,336 | A | 2/1990 | Pittner et al. |
| 4,966,654 | A | 10/1990 | Carberry |
| 4,979,886 | A | 12/1990 | Rippberger |
| 4,982,788 | A | 1/1991 | Donnelly |
| 5,018,576 | A | 5/1991 | Udell et al. |
| 5,032,230 | A | 7/1991 | Shepherd |
| 5,035,810 | A | 7/1991 | Heisel et al. |
| 5,050,676 | A | 9/1991 | Hess et al. |
| 5,061,458 | A | 10/1991 | Miller |
| 5,069,796 | A | 12/1991 | Fox |
| 5,076,360 | A | 12/1991 | Morrow |
| 5,080,793 | A | 1/1992 | Urlings |
| 5,104,525 | A | 4/1992 | Roderick |
| 5,104,554 | A | 4/1992 | Dempsey |
| 5,106,507 | A | 4/1992 | Von Klock et al. |
| 5,116,515 | A | 5/1992 | Selesnick |
| 5,122,165 | A | 6/1992 | Wang et al. |
| 5,122,166 | A | 6/1992 | Hyreyk et al. |
| 5,143,607 | A | 9/1992 | Bernhardt |
| 5,147,535 | A | 9/1992 | Bernhardt |
| 5,151,197 | A | 9/1992 | Smith et al. |
| 5,171,103 | A | 12/1992 | Bernhardt |
| 5,171,334 | A | 12/1992 | Kabis |
| 5,172,764 | A | 12/1992 | Hajali et al. |
| 5,173,092 | A | 12/1992 | Rudder |
| 5,176,798 | A | 1/1993 | Rodden |
| 5,180,503 | A | 1/1993 | Gorelick et al. |
| 5,183,563 | A | 2/1993 | Rodden |
| 5,190,665 | A | 3/1993 | Titmas et al. |
| 5,190,668 | A | 3/1993 | Chuang |
| 5,197,541 | A | 3/1993 | Hess et al. |
| 5,202,032 | A | 4/1993 | Shoemaker |
| 5,220,958 | A | 6/1993 | Bernhardt |
| 5,246,584 | A | 9/1993 | Donaldson et al. |
| 5,248,395 | A | 9/1993 | Rastelli et al. |
| 5,259,931 | A | 11/1993 | Fox |
| 5,271,467 | A | 12/1993 | Lynch |
| 5,273,572 | A | 12/1993 | Baker et al. |
| 5,275,732 | A | 1/1994 | Wang et al. |
| 5,279,746 | A | 1/1994 | Ziol |
| 5,294,303 | A | 3/1994 | Robbins |
| 5,304,704 | A | 4/1994 | Kammeraad |
| 5,312,552 | A | 5/1994 | Norman |
| 5,340,383 | A | 8/1994 | Womack |
| 5,352,276 | A | 10/1994 | Rentschler et al. |
| 5,352,335 | A | 10/1994 | Beaver |
| 5,358,357 | A | 10/1994 | Mancini et al. |
| 5,368,700 | A | 11/1994 | Bachmann |
| 5,368,754 | A | 11/1994 | Von Klock et al. |
| 5,383,958 | A | 1/1995 | Battaglia |
| 5,389,126 | A | 2/1995 | Baker et al. |
| 5,389,208 | A | 2/1995 | Beasley et al. |
| 5,389,267 | A | 2/1995 | Gorelick et al. |
| 5,403,476 | A | 4/1995 | Bernhardt |
| 5,425,598 | A | 6/1995 | Pennington |
| 5,439,594 | A | 8/1995 | Regan |
| 5,441,365 | A | 8/1995 | Duffney et al. |
| 5,451,300 | A | 9/1995 | Matros et al. |
| RE35,074 | E | 10/1995 | Lamarre |
| 5,458,739 | A | 10/1995 | Boucher et al. |
| 5,464,309 | A | 11/1995 | Mancini et al. |
| 5,464,540 | A | 11/1995 | Friesen et al. |
| 5,478,481 | A | 12/1995 | Kazama et al. |
| 5,480,538 | A | 1/1996 | McCombs et al. |
| 5,529,121 | A | 6/1996 | Partridge et al. |
| 5,552,051 | A | 9/1996 | Wang et al. |
| 5,562,834 | A | 10/1996 | Bremer et al. |
| 5,575,589 | A | 11/1996 | Suthersan |
| 5,588,490 | A | 12/1996 | Suthersan et al. |
| 5,595,586 | A | 1/1997 | Sivavec |
| 5,614,086 | A | 3/1997 | Hill et al. |
| 5,618,417 | A | 4/1997 | Spindler |
| 5,620,593 | A | 4/1997 | Stagner |
| 5,622,450 | A | 4/1997 | Grant, Jr. |
| 5,641,401 | A | 6/1997 | Stultz et al. |
| 5,685,976 | A | 11/1997 | Lamarre |
| 5,707,528 | A | 1/1998 | Berry |
| 5,734,089 | A | 3/1998 | Thompson et al. |
| 5,766,457 | A | 6/1998 | Spindler |
| 5,769,927 | A | 6/1998 | Gottschlich et al. |
| 5,772,731 | A | 6/1998 | Harrison |
| 5,777,214 | A | 7/1998 | Thompson et al. |
| 5,787,537 | A | 8/1998 | Mannillo |
| 5,836,718 | A | 11/1998 | Price |
| 5,855,775 | A | 1/1999 | Kerfoot |
| 5,863,510 | A | 1/1999 | Pozniak et al. |
| 5,906,241 | A | 5/1999 | Pehlivan et al. |
| 5,967,230 | A | 10/1999 | Cooper et al. |
| 5,980,613 | A | 11/1999 | Reiber |
| 5,993,608 | A | 11/1999 | Abry et al. |
| 6,007,274 | A | 12/1999 | Suthersan |
| 6,024,882 | A | 2/2000 | McNeilly et al. |
| 6,030,533 | A | 2/2000 | Karamanev et al. |
| 6,036,748 | A | 3/2000 | Wallace et al. |
| 6,083,407 | A | 7/2000 | Kerfoot |
| 6,102,623 | A | 8/2000 | Suthersan |
| 6,110,361 | A | 8/2000 | Bower et al. |
| 6,136,204 | A | 10/2000 | Krejci |
| 6,158,924 | A | 12/2000 | Athens et al. |
| 6,174,108 | B1 | 1/2001 | Suthersan |
| 6,183,162 | B1 | 2/2001 | Sheppard et al. |
| 6,193,893 | B1 | 2/2001 | Mazzei et al. |
| 6,197,162 | B1 | 3/2001 | Quiros |
| 6,197,206 | B1 | 3/2001 | Wasinger |
| 6,206,098 | B1 | 3/2001 | Cooper et al. |
| 6,214,242 | B1 | 4/2001 | Swensen |
| 6,217,767 | B1 | 4/2001 | Clark |
| 6,224,716 | B1 | 5/2001 | Yoder |
| 6,238,574 | B1 | 5/2001 | Cesa et al. |
| 6,251,289 | B1 | 6/2001 | Sherman |
| 6,254,310 | B1 | 7/2001 | Suthersan |
| 6,254,311 | B1 | 7/2001 | Manchester |
| 6,270,063 | B1 * | 8/2001 | Carrillo ............... 261/122.1 |
| 6,277,175 | B1 | 8/2001 | Halder et al. |
| 6,280,625 | B1 | 8/2001 | Jackson, Jr. et al. |
| 6,283,674 | B1 | 9/2001 | Suthersan |
| 6,284,143 | B1 | 9/2001 | Kerfoot |
| 6,299,781 | B1 | 10/2001 | Hanrahan |
| 6,306,296 | B1 | 10/2001 | Kerfoot |
| 6,312,605 | B1 | 11/2001 | Kerfoot |
| 6,321,837 | B1 | 11/2001 | Doering et al. |
| 6,355,096 | B1 | 3/2002 | Schmidtke |
| 6,383,399 | B2 | 5/2002 | Sherman |
| 6,423,235 | B1 | 7/2002 | Shimoi et al. |
| 6,436,285 | B1 | 8/2002 | Kerfoot |
| 6,502,633 | B2 | 1/2003 | Cooper et al. |
| 6,503,395 | B1 | 1/2003 | Salanitro et al. |
| 6,508,916 | B1 | 1/2003 | Razzaghi et al. |
| 6,558,452 | B1 | 5/2003 | Stönner et al. |
| 6,582,611 | B1 | 6/2003 | Kerfoot |
| 6,596,161 | B2 | 7/2003 | Kerfoot |
| 6,632,973 | B1 | 10/2003 | Miyake et al. |
| 6,635,149 | B1 | 10/2003 | Campbell et al. |
| 6,740,205 | B2 | 5/2004 | Molintas |

(56) References Cited

U.S. PATENT DOCUMENTS

| | | |
|---|---|---|
| 6,780,329 B2 | 8/2004 | Kerfoot |
| 6,787,038 B2 | 9/2004 | Brusseau et al. |
| 6,805,798 B2 | 10/2004 | Kerfoot |
| 6,818,136 B1 | 11/2004 | Marek |
| 6,827,861 B2 | 12/2004 | Kerfoot |
| 6,872,318 B2 | 3/2005 | Kerfoot |
| 6,875,351 B2 | 4/2005 | Arnaud |
| 6,878,188 B2 | 4/2005 | Yi |
| 6,913,699 B2 | 7/2005 | Moisy et al. |
| 6,932,889 B1 | 8/2005 | Holcomb |
| 6,984,329 B2 | 1/2006 | Kerfoot |
| 7,022,241 B2 | 4/2006 | Kerfoot |
| 7,029,589 B2 | 4/2006 | McGinness |
| 7,033,492 B2 | 4/2006 | Kerfoot |
| 7,087,157 B2 | 8/2006 | Spani |
| 7,153,427 B2 | 12/2006 | Burke |
| 7,156,984 B2 | 1/2007 | Kerfoot |
| 7,163,636 B2 | 1/2007 | Spani |
| 8,101,089 B2 * | 1/2012 | Drewelow .................... 210/767 |
| 2002/0030001 A1 | 3/2002 | Napper et al. |
| 2002/0053507 A1 | 5/2002 | Belmar |
| 2002/0162805 A1 | 11/2002 | Shenoi |
| 2003/0094100 A1 | 5/2003 | Page |
| 2003/0188962 A1 | 10/2003 | Atwell |
| 2004/0231513 A1 | 11/2004 | Perkins et al. |
| 2005/0046055 A1 | 3/2005 | Kerfoot |
| 2005/0172808 A1 | 8/2005 | Yi |
| 2005/0176925 A1 | 8/2005 | Fujino et al. |
| 2005/0252376 A1 | 11/2005 | McNulty |
| 2006/0032375 A1 | 2/2006 | Verscharen |
| 2006/0150814 A1 | 7/2006 | Goksoyr et al. |
| 2006/0196358 A1 | 9/2006 | Levin |
| 2008/0237141 A1 | 10/2008 | Kerfoot |

FOREIGN PATENT DOCUMENTS

| | | |
|---|---|---|
| JP | 2003-154356 A | 5/2003 |
| JP | 2004-008969 A | 1/2004 |
| JP | 2004-105905 A | 4/2004 |
| WO | WO 91/01794 A1 | 2/1991 |
| WO | WO 93/16779 A1 | 9/1993 |
| WO | WO 93/16780 A1 | 9/1993 |
| WO | WO 2006/069418 A1 | 7/2006 |

* cited by examiner

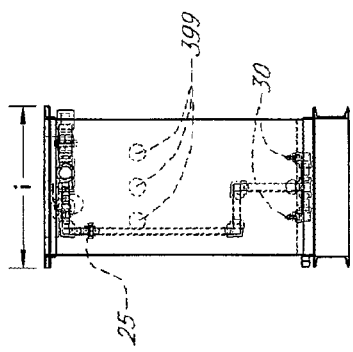
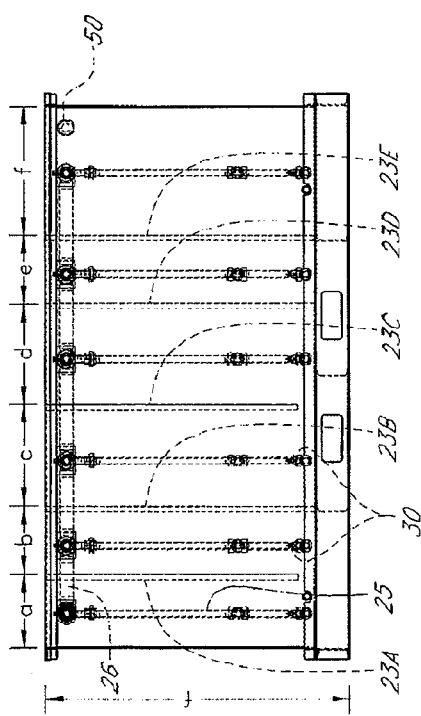
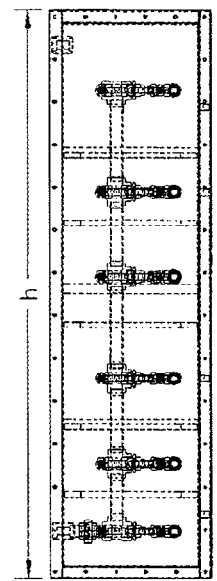
FIG. 8C
FIG. 8B
FIG. 8D

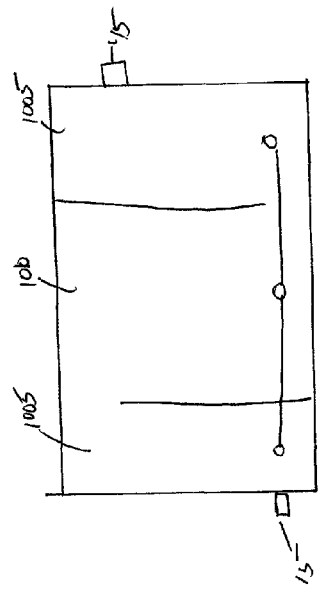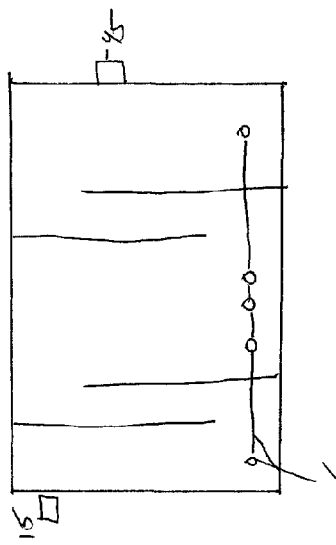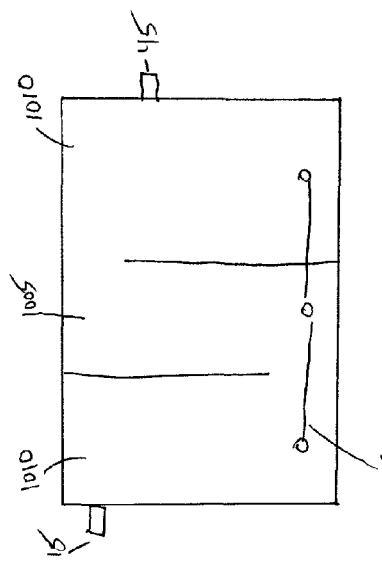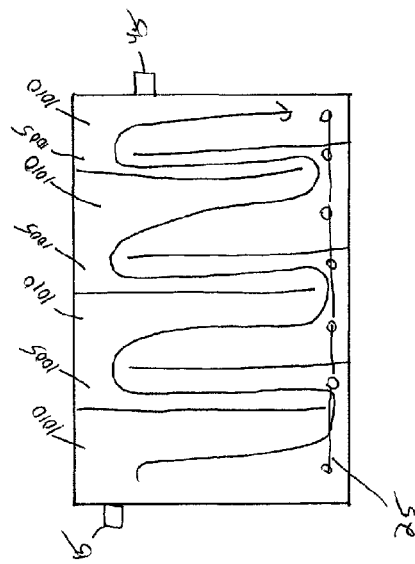

APPARATUS FOR AERATION OF CONTAMINATED LIQUIDS

CROSS-REFERENCE TO RELATED APPLICATIONS

This application is a continuation of U.S. patent application Ser. No. 11/938,199, filed Nov. 9, 2007, now U.S. Pat. No. 8,101,089, which claims the priority benefit under 35 U.S.C. §119(e) of the U.S. provisional application No. 60/956,061, filed Aug. 15, 2007, which is hereby incorporated by reference in its entirety.

BACKGROUND

1. Field

The invention relates to systems and methods for reducing contaminants in contaminated liquids such as contaminated ground water.

2. Description of the Related Technology

The most common sources of water contamination include but are not limited to the environmental, marine, and the petroleum industries. Water is typically contaminated with fuel hydrocarbons such as gasoline, diesel, and aviation fuel. The source of the contamination are facilities such as gasoline stations, fuel distribution terminals, underground storage tanks, military bases, airports, rail yards, shipyards, dry cleaning plants, metal plating shops, and manufacturing facilities. These facilities regularly contaminate water with volatile organic compounds (VOC's); i.e., Benzene, Toluene, Ethyl Benzene, Xylene, (these four compounds are commonly referred to as BTEX); Methyl-Tertiary-Butyl-Ether (MTBE), tert-Butanol (TBA), Trichloroethene (TCE), Perchloroethene (PCE), and 1,4-Dioxane. It is therefore desirable to remove such contaminants from groundwater to meet regulator standards.

SUMMARY

Embodiments of aerator modules and systems comprising aerator modules are described herein. In some embodiments, aerator modules include an aeration tank. In one embodiment, an apparatus for reducing levels of contaminants in a contaminated liquid comprises a tank. In some embodiments, the aeration tank includes an inlet for introducing a contaminated liquid to the tank, an outlet for outputting an output liquid having less contaminants than the contaminated liquid, and a lid for preventing gaseous contaminants from the contaminated liquid from escaping to an atmosphere surrounding the tank. According to some embodiments, the aeration tank may also include a plurality of first and second partitions disposed between the inlet and the outlet, each of the first partitions extending from the lid to a first level above a bottom of the tank, and each of the second partitions extending from the bottom of the tank to a second level below the lid of the tank, the plurality of first and second partitions forming a plurality of chambers through which the contaminated liquid flows. In some embodiments, a vent is positioned between the second level and the lid, or on the lid, or proximate to the lid, or in the headspace of the aeration tank, for removing the gaseous contaminants. In some embodiments, one or more of the chambers created by the partitions include at least one gas output located within each chamber of the tank.

In another embodiment, an aeration tank includes a plurality of chambers which in total comprise the volume of the tank, wherein at least some of the plurality of chambers are configured to form a sinusoidal flow path for the contaminated water as it passes through an opening in a partition of each chamber.

In another embodiment, the aeration tank includes at least one countercurrent flow chamber having a first inlet side, a first outlet side, and a gas source output for delivering gas to a contaminated liquid, and at least one current flow chamber in fluid connection with the at least one countercurrent flow chamber, the at least one current flow chamber having a second inlet side and a second outlet side. In some of these embodiments, the distance between the first inlet side and the first outlet side of the countercurrent flow chamber is greater than the distance between the second inlet side and the second outlet side of the current flow chamber.

In another embodiment, the aeration tank includes a plurality of partitions defining at least one current chamber and at least one counter current chamber, the counter current chamber having a larger volume than the current chamber, wherein the counter current chamber comprises at least one gas source output for delivering gas to contaminated water within the counter current chamber. In some embodiments, a current flow chamber is positioned between two countercurrent flow chambers. In some embodiments, a countercurrent flow chamber is positioned between two current flow chambers. In some embodiments, the final flow chamber is selected from a current or countercurrent flow chamber.

In any of the discussed embodiments, the aeration tank may include at least one float switch. In some embodiments, the float switch is located in the chamber having the outlet. In some embodiments, the float switch is operationally connected to the outlet for opening and closing a valve or other output means which allows for removal of the output liquid from the tank. In one embodiment, the at least one float switch is within the chamber having the outlet, and the float switch is operationally connected to a pump for removing output water from the outlet when water reaches a predetermined high level in the chamber. In another embodiment, a float switch is operationally connected to a pump for stopping the removal of output water when water reaches a predetermined low level in the chamber.

As described herein, baffles within the aeration tank may form a plurality of chambers. In some embodiments, these chambers form a sinuous path for the contaminated water as it travels between the chamber having the inlet to the succeeding chambers.

In any of the mentioned embodiments, the flow of water through the aeration tank may take place in a continuous and/or batch process. For example, the rate of input mater may be substantially equal to the rate of output water, thus allowing for the continuous flow of contaminated liquid through the aeration tank. In some embodiments, such water input and output flow rates is accomplished by using an inlet flow regulator for regulating the input rate of the contaminated water into the inlet and an outlet flow regulator for regulating the output rate of the output water into the outlet. While the input rate is approximately equal to the output rate, the input rate may also be greater than or less than the output rate, such that the process can be operated in batch form.

In any of the embodiments, a vacuum source may connected to the tank for removing gaseous contaminants from the tank. For example, a process gas blower of a oxidation unit may be fluidly connected to the aeration tank such that the gaseous contaminants flow to the process gas blower and into the oxidation unit for treatment. In some embodiments, a treatment system is configured to receive contaminated gases from the tank.

In some embodiments, further water treatment may be necessary. In one embodiment, a separator tower module may receive water from the tank, and further purify such water. However, other treatment means may be used for the water including, but not limited to, carbon filters.

In some embodiments, a method for removing gaseous contaminants from a liquid includes introducing contaminated water into the tank of the apparatus of any embodiment described herein, passing such water through one or more chambers of the tank, at least some of the chambers comprising baffles configured to create a sinuous like path for the water, aerating the water in one or more chambers of the tank with a gas as it flows through the chambers, and outputting water having less contaminants that the contaminated water. In some embodiments, the gaseous contaminants may be removed for treatment or otherwise vented, depending on the contaminant and environmental regulations governing the release of such contaminants.

In some embodiments, the steps of introducing and outputting occur at substantially similar rates such that the method is continuous for an amount of time. In some embodiments, the step of outputting the water includes filling the last chamber of the tank having an outlet with the water until the water reaches a first predetermined level; and activating an output means for outputting the water at a rate. In some embodiments, the output means is one or more selected from a pump, a valve, a solenoid, or a filter. In some embodiments, the method may further include deactivating the output means when that the water in the last chamber reaches a second predetermined height lower than the first predetermined height.

In the foregoing embodiment, the aerator module is configured to receive the contaminated liquid. The contaminated liquid may be received from one or more contaminated sources. In a preferred embodiment, the aerator module comprises a tank to receive the contaminated liquid. In one embodiment, the aerator module comprises a plurality of nozzles which deliver a gas to the contaminated liquid. As the gas is delivered to the contaminated liquid, bubbles containing the gas form in the liquid and rise to the surface of the aerator module tank. As the bubbles pass through the contaminated liquid, the contaminants of the contaminated liquid changes phases from the dissolved contaminant into gaseous contaminants. The gaseous contaminants rise with the bubbles to the top of the aeration tank.

In some embodiments, the aerator module comprises a tank, an air distribution manifold and a compressor capable of delivering a gas or a mixture of gases such as compressed air to the air distribution manifold. In some embodiments, the tank is capable of receiving a contaminated liquid by a liquid influent connection. At least a part of the clean air distribution manifold can be contained within the tank comprising the contaminated liquid. In some embodiments, the compressor delivers air or another gas, such as ozone, to the air distribution manifold. The air distribution manifold may comprise one or more orifices which are contained within the tank through which the air is released as bubbles into the contaminated liquid contained in the tank. In some embodiments, the tank comprises baffles which create a more tortuous path for the contaminated liquid to reach the outlet of the tank. The tank may be kept under a partial static vacuum to prevent leakage of gaseous contaminants to the environment. As the bubbles travel through the contaminated liquid, at least some of the contaminants in the contaminated liquid transfer phase from liquid to gas phase and are removed from the liquid as the bubble exits the contaminated liquid. This results in a contaminated gas phase in a part of the tank. The contaminated gas phase may be removed by vacuum pump.

In some embodiments, the aeration module operates under a reduced pressure. One or more vacuum pumps may be adapted to reduce the pressure of the aeration module. As the contaminants and bubbles reach the surface of the contaminated liquid, these contaminants may be transported to the one or more systems for treating gaseous contaminants by the vacuum pump. Additionally, the residence time for the bubbles in the aeration module may be increased to increase the amount of contaminants delivered to the gas phase in the aeration module. For example, the aeration tank may comprise baffles which create a more tortuous path for the water and increased residence time for the bubbles.

In a preferred embodiment, the aeration module may operate in a continuous mode. Initially, the aeration tank receives the contaminated liquid. As the aeration tank receives the contaminated liquid, the tank fills up with the contaminated liquid to a fixed level. The fixed level may be designated by a switch or detector. The switch or detector may operate a pump which is capable of transporting the contaminated liquid out of the aeration tank and to one or more components as described herein. As the contaminated liquid is passed out of the aeration tank, additional contaminated liquid may begin to fill the aeration tank. This process allows the aeration tank to operate in a continuous manner. The rates of influent and effluent contaminated liquid may be varied to adjust the flow rates of the contaminated gas and/or efficiency of the aeration module in removing contaminants from the contaminated liquid.

In some embodiments, the effluent contaminated liquid from the aeration tank may be passed to one or more other modules. Such modules include one or more other aeration modules, one or more filter modules, one or more separator tower modules, or preferably, a combination of any of the foregoing.

In another embodiment of an apparatus for reducing levels of one or more contaminants in contaminated water, the apparatus includes a first container configured to receive contaminated water; the container including one or more side walls, one or more bottom walls, and one or more top walls, the one or more side walls, the one or more bottom walls, and the one or more tops walls are in contact to define an interior of the container. In some embodiments, the container also includes a first inlet in fluid connection with a contaminated water source, at least one second inlet in fluid connection with a gas source, a first outlet in fluid connection with a liquid transfer pump, and a second outlet coupled to a first vacuum source. In some embodiments, the interior is adapted to contain contaminated liquid, and the second inlet is configured to deliver a gas to the contaminated liquid. The apparatus may further include a tower in fluid connection with the liquid transfer pump, the tower further including a third inlet for receiving the contaminated liquid from the liquid transfer pump, a vacuum chamber having a third outlet coupled to a second vacuum source; and a plurality of nozzles in fluid connection with the third inlet. In some embodiments, the plurality of nozzles configured to deliver the contaminated liquid to the vacuum chamber as an atomized liquid. In some embodiments, the tower may further include a bottom for receiving a cleaned contaminated liquid, and a fourth outlet located near the bottom for removing the cleaned contaminated liquid.

In some embodiments, the at least one second inlet is connected to a gas manifold located at least partially within the interior of the container, the gas manifold comprising a plurality of orifices configured to deliver air to contaminated water in the first container. In some embodiments, the contaminated water source is one or more means for treating water, including one or more components described herein. In some embodiments, the contaminated water source is the ground.

In some embodiments, the first container is a baffled container. In some embodiments, the first container comprises a plurality of surfaces adapted to create an indirect path for the contaminated water within the interior of the container. In some embodiments, at least some of the orifices of the gas manifold are located near the one or more bottom walls of the container. In some embodiments, the interior of the container comprises two or more chambers, each chamber partially separated by a set of walls, wherein at least some of the walls define openings between each chamber for allowing contaminated water to pass through said two or more chambers. In some embodiments, the gas manifold has one or more orifices for creating bubbles within one or more of the chambers, the gas manifold being in fluid connected with the second inlet.

In some of the foregoing apparatus embodiments, a means for treating a contaminated gas may further be included. Such the treatment means in fluid connection with the third outlet of the vacuum chamber. In some embodiments, a contaminated gas treatment system in fluid connection with the second outlet of the first container and the third outlet of the vacuum chamber. In some embodiments, the contaminated gas treatment system is one or more selected from the group consisting of an electric catalytic oxidizer, a thermal oxidizer, an adsorption filtration system, a condenser, a flame oxidizer, a cryogenic treatment system, a gas cooling and liquefaction system, a regenerative thermal oxidizers, and a rotary concentrators.

In another embodiment, an apparatus includes a tank for containing a liquid, the tank comprising a first inlet for influent transport of the liquid, a first outlet for effluent transport of the liquid, and a second outlet for the effluent transport of a contaminated gas the tank further comprising a plurality of baffles, each baffle mounted within the tank in substantially parallel positions, wherein the liquid from the first inlet is configured to travel in one or more chambers within the tank to the first outlet, each chamber separated by at least one of the plurality of baffles, and each chamber comprising a gas delivery system for bubbling a gas through the liquid. Some embodiments may further include a first vacuum source in fluid connection with the second outlet of the tank, the vacuum source configured to deliver the contaminated gas to a gas treatment system. In some embodiments, the apparatus includes a gas treatment system. In certain embodiments, the first vacuum source is at least a portion of a gas treatment system. For example, in some embodiments, the gas treatment system is an electric catalytic oxidizer, and the at least a portion is an oxidizer blower capable of creating the vacuum source.

BRIEF DESCRIPTION OF THE DRAWINGS

FIG. 8B is a front view of an aerator module.

FIG. 8C is a side view of an aerator module.

FIG. 8D is a top view of an aerator module.

FIG. 8F is another nonlimiting embodiment of a baffled aeration tank module.

FIG. 8G is another nonlimiting embodiment of a baffled aeration tank module.

FIG. 8H is another nonlimiting embodiment of a baffled aeration tank module.

FIG. 8I is another nonlimiting embodiment of a baffled aeration tank module.

DETAILED DESCRIPTION OF EMBODIMENTS

Figure 1:
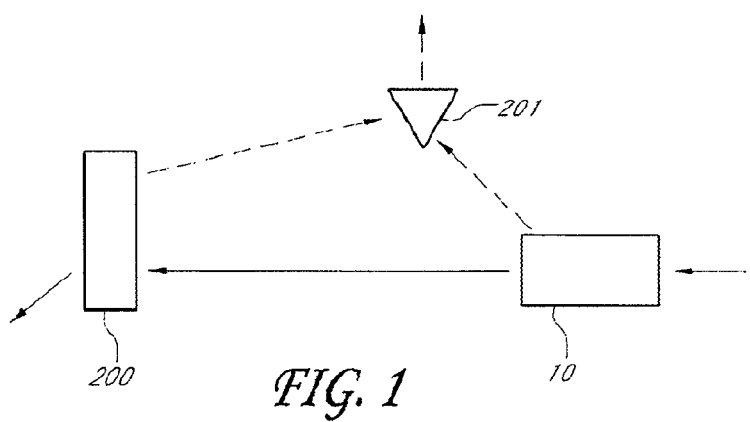
FIG. 1 is a drawing of one embodiment including an aerator module, a separator tower, and a contaminated gas treatment system.

Described herein are systems and methods for separating contaminants from liquids. Contaminated liquids may include water, alcohols, hydrocarbons, oils, slurries, solutions, dissolved and melted solids, or condensed gases. In certain embodiments, water is the contaminated liquid. Some embodiments described herein are specifically in relation to contaminated water, but it may also be applicable to many other contaminated liquids.

In some embodiments, contaminated water contains contaminants which are more volatile than the contaminated water. For example, the contaminants in the contaminated water may have a boiling point that is less than that of water. Other examples include those contaminants having a higher vapor pressure than water. Contaminants may include at least one volatile organic compound (VOC). For example, contaminants may include, but are not limited to, benzene, toluene, ethyl benzene, xylene, (these four compounds are commonly referred to as BTEX); methyl-tertiary-butyl-ether (MBTE), tert-butanol (TBA), trichloroethene (TCE), perchloroethene (PCE), and 1,4-dioxane, and other contaminants described herein. Many of the contaminants are soluble in the contaminated liquid. However, the contaminants may also be suspended in the contaminated liquid. The contaminants may also be immiscible with the contaminated liquid, and may in some cases form an emulsion.

Additionally, some embodiments of the liquid decontamination system are also capable of purifying contaminated liquid with contaminants which are solids. Contaminants may also include solids such as sediment and sand. Small particles having a diameter larger than about 0.1, 0.2, 0.3, 0.4, 0.5, 1, 2, 5, 7, 9, 12, 15, and 20 microns may also be purified by a filtration system of the liquid decontamination system. Solids may also include larger objects, and such objects may be purified from the contaminated water by sieves, filters, traps, and other similar means of filtering solids from liquids.

In another embodiment, the systems and methods as described herein are capable of purifying contaminated liquids with contaminants which are gases at standard temperature and pressure such as nitrogen. The processes such as aeration and air stripping of contaminated water may generally result in the removal from dissolved gases in the contaminated ground water. As will be recognized by a person having skill in the art, many of the VOC contaminants are in equilibrium between their liquid and gaseous states.

In certain embodiments, the system and methods employ a multi-step process to remove various contaminants from liquids. In some of these embodiments, a system for separating contaminants from a contaminated liquid comprises one or more selected from a group consisting of an aerator module, a filtering module, a separation tower module, and a contaminated gas treatment system. These component modules of a system for separating contaminants from contaminated liquids may be used together in combination. In some embodiments, only one module is necessary to remove the contaminants from the contaminated liquid. In other embodiments, two or more selected from at least one aerator module, at least one separator tower, at least one filter module, and at least one contaminated gas treatment system are used to separate the contaminants from the contaminated water.

Referring to FIG. 1, one embodiment includes an aerator module 10 in fluid connection with the separator tower 200. The aerator module is adapted to convey volatile gaseous contaminants to a contaminated treatment system 201. Further the aerator module 10 can further convey contaminated water to the separator tower 200, which can further separate contaminants from the contaminated water, and transfer those contaminants to a contaminated treatment system 201. Optionally, contaminants from the separator tower may be treated by a separate contaminated gas treatment system 202.

Figure 2:
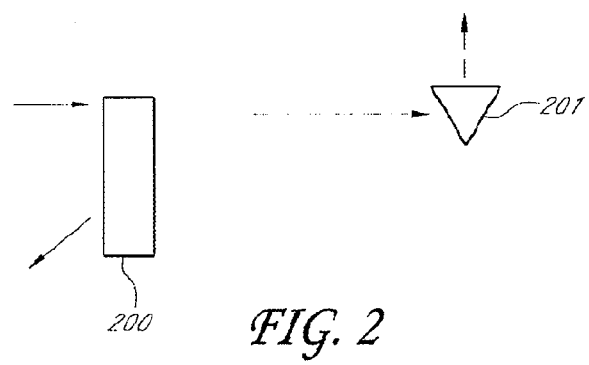
FIG. 2 is a drawing of one embodiment including a separator tower and a contaminated gas treatment system.

Referring to FIG. 2, one embodiment includes a separator tower 200 and a contaminated gas treatment system 201. The separator tower 200 is capable of receiving contaminated water and separating at least some contaminants from the water. The contaminated gas treatment system 201 may then receive and treat the contaminants from the separator tower 200.

Figure 3:
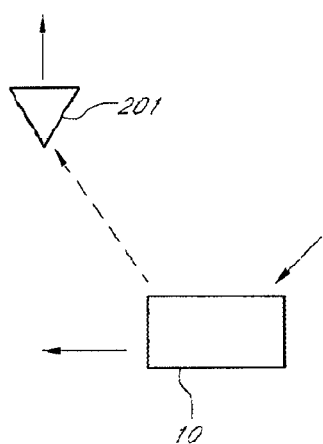
FIG. 3 is a drawing of one embodiment including an aerator module and a contaminated gas treatment system.

Referring to FIG. 3, one embodiment includes an aerator module 10 and a contaminated gas treatment system 201. The aerator module is capable of separating contaminants from contaminated water. The contaminated gas treatment system 201 may then receive the contaminants from the aerator module 10.

Figure 4:
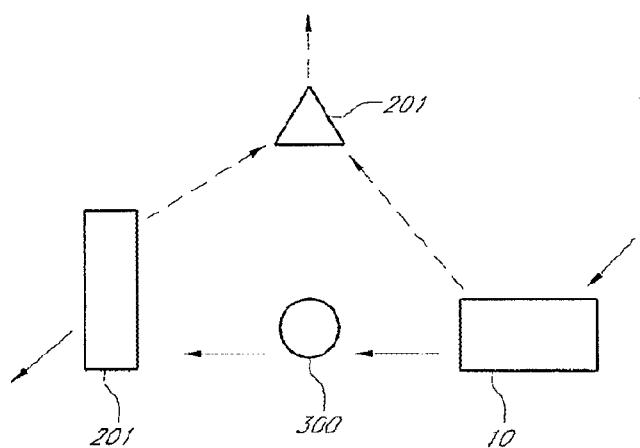
FIG. 4 is a drawing of one embodiment including an aerator module, a filter module, a separator tower, and a contaminated gas treatment system.

Referring to FIG. 4, one embodiment includes an aerator module 10, a filter module 60, a separator tower 200, and a contaminated gas treatment system 201. The aerator module 10 may receive contaminated water and separate at least some contaminants from the contaminated water. The contaminated gas treatment system 201 may receive contaminants from the aerator module 10. In addition, the aerator module 10 may then convey the contaminated water through a filter module to reduce the amount of solid contaminants, and the contaminated water may then be transferred to separator tower 200. The separator tower 200 is capable of receiving contaminated water and separating at least some contaminants from the water. The contaminants from the separator tower 200 may then be transported to the contaminated gas treatment system 201. In some embodiments, the contaminants from separator tower 200 may be combined with some contaminants from the aerator module 10 prior to or during treatment by the contaminated gas treatment system 201.

Figure 5:
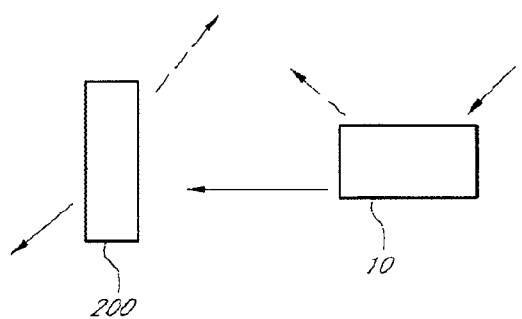
FIG. 5 is a drawing of one embodiment including an aerator module and a separator tower.

Referring to FIG. 5, one embodiment includes aerator module 10 and a separator tower 200. Contaminated water enters the aerator module 10 and is aerated which produces contaminants which exit the aerator module 10. The water may then be transferred from aerator module 10 to separator tower 200. In separator tower 200, the contaminants from the contaminated water and transferred into gas phase contaminants which exit separator tower. As a result, cleaned water may be recovered from separator tower 200.

Figure 6:
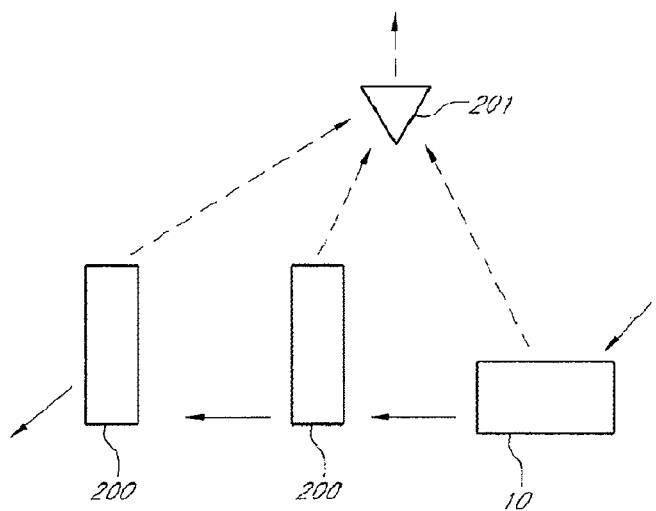
FIG. 6 is a drawing of one embodiment including an aerator module, two separator towers in series, and a contaminated gas treatment system.

Referring to FIG. 6, one embodiment includes aerator module 10, two or more separator towers 200, and a contaminated gas treatment system 201. In this embodiment, contaminated water is aerated in the aerated module, separating at least some of the contaminants. The contaminated water may be transferred to separator tower 200, where more contaminants change phase into gas phase contaminants, and the process may be repeated in the second separator tower 200.

One advantage of a multi-step system is the increased efficiency in purifying contaminants from the contaminated liquid. By employing multiple components to purify a liquid, each component may selectively target a specific contaminant. For example, a liquid contaminated with solid particles and VOCs can be purified by the use of a filter module 10 and the separator tower 200. However, in some preferred embodiments, a system comprising an aerator module 10, a filtering module 60, a separator tower module 200, and a contaminated gas treatment system 201 provides an efficient method of removing contaminants from a contaminated liquid. In certain embodiments, the same contaminant is purified in more than one component of the liquid purification system.

A general description of a process using an aerator 10, filter 60, separator tower 200, and a contaminated gas treatment system 201 is provided below. A contaminated liquid may be introduced into an aeration tank 10 comprising an aeration compressor 20. Such aeration compressor 20 operates to produce small bubbles that rise through the contaminated liquid into the headspace 12 of the aeration tank 10. Bubbles introduced to the contaminated liquid carry contaminants from the contaminated liquid into the headspace 12 of the aeration tank 10. Additionally, an aeration tank 11 may comprise baffles to create a more tortuous path for the water and to expose the bubbles to more surface area of the water. In turn, such a method would result in the increased efficiency in the removal of contaminants by the aerator module 10. These contaminants are then transferred out of the aeration tank 10 with the contaminated air and processed by the contaminated gas treatment system 201. In some embodiments, the aerator module operates under a static or dynamic vacuum to prevent the egress of contaminants. The contaminated gas treatment system 201 may release the purified gas stream as environmentally safe exhaust into the atmosphere, or may otherwise trap the contaminants.

In some embodiments, liquids which have been processed by the aerator module 10 may be transferred to one or more other treatment modules 201, 202. In one embodiment, the contaminated liquid may be transferred to at least one filter module 60. In some embodiments, a liquid transfer pump is used to transfer liquid from the aerator module 10 to a filter 60. In one embodiment, the filter module comprises a bag filter housing. In another embodiment, the filter module comprises two bag filter housings arranged in series. The bag filter housings are capable of removing solids which are contaminants and/or those solids that could potentially foul equipment down stream of the filter. Optionally, filter modules 60 may be placed prior to the aerator module 10, or both prior to and after the aerator module 10.

In some embodiments, the contaminated liquid may be transferred to a separator tower module 200. In some embodiments of this module, the liquid enters a sealed vacuum chamber through at least one atomizing spray nozzle. The liquid is thus converted into a mist. The vacuum environment converts the contaminated liquid mist into a contaminated gas phase and a liquid mist phase. The pressure inside such a chamber may vary, but includes from about 20 inches of HgG to about 30 inches of HgG, and more preferably about 26 inches of HgG. In one embodiment, the pressure is about 2 PSIA. The vacuum environment can be tuned depending on the contaminants and the liquid to be decontaminated, and thus be less than 20 inches or greater than 30 inches of HgG. One example of a vacuum pump that may be used is the Siemens 2BL-8.3 HP Vacuum Pump Unit.

The contaminated gas phase can then be carried away by the vacuum pump. Additionally, the liquid mist can pass over optional random packing, thus exposing the mist to more surface area within the separator tower 200. To assist in the removal of the gas phase contaminants, carrier air can be added to the separator tower 200. The carrier air passes over the packing material that has exposed more surface area of the liquid mist, thus removing any remaining contaminants of the liquid mist phase. The dilution air comprising the contaminants is then carried toward the vacuum pump. In some embodiments, the rate and amount dilution air can be controlled to increase the efficiency of removing the contaminants from the contaminated water in the separator tower 200.

The liquid mist may collect into liquid droplets. These droplets may collect in the bottom portion of the separator tower (also know as the sump). The liquid may be pumped out of the separator tower into a storage tank. In some embodiments, the liquid can be taken directly from the separator tower. Such liquid may subjected to one or more other treatment means, including the modules as described herein.

In some embodiments, the liquid may container less than 10% of the targeted contaminants of the contaminated liquid. In some embodiments, the decontaminated liquid comprises less than about 5%, 4.5%, 4%, 3.5%, 3%, 2.5%, 2%, 1.5%, 1% of the targeted contaminants of the contaminated liquid. In preferred embodiments, the purified liquid contains less than 1% of the targeted contaminants including about 0.0001%, 0.001%, 0.01%, 0.5%, 0.1%, and 0.5%, and values between the foregoing.

In some embodiments, the contaminated gas phase and the carrier air (also referred to herein as the dilution air) are carried out of the separator tower. In some embodiments, these gases pass through the process gas blower. Optionally, the contaminants may also pass through a contaminated gas treatment system. Such systems are further described herein.

The modules and certain embodiments are further described below as they relate to the accompanying figures. However, this is in no way intended to limit the scope of the invention which is defined by the claims that follow.

Aerator Module

Figure 7:
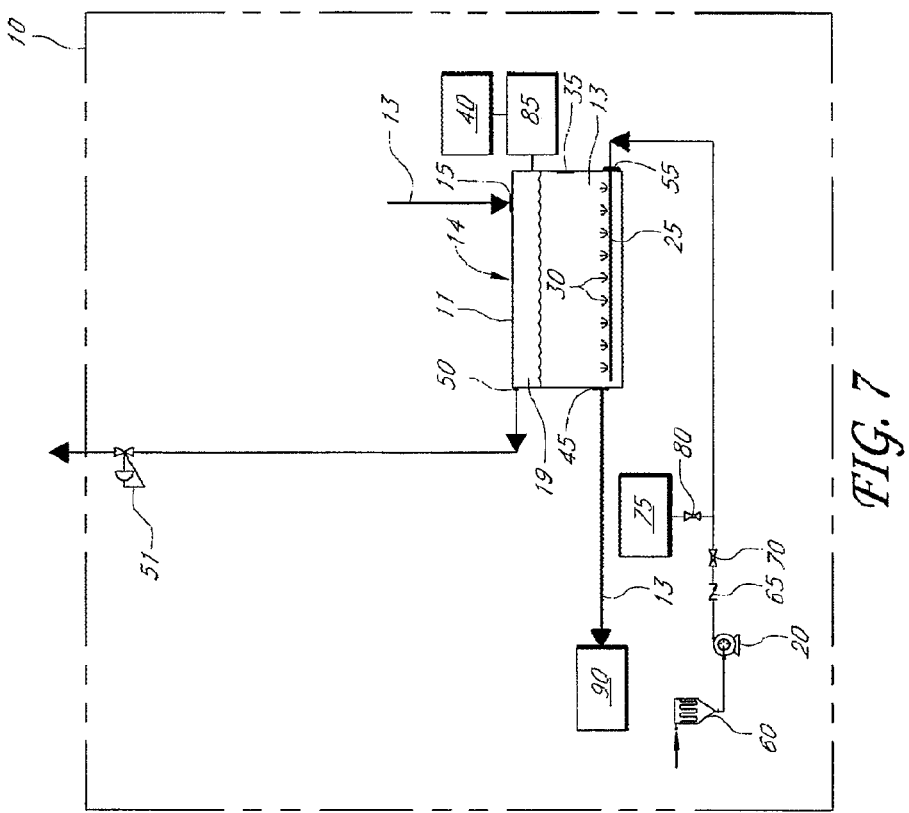
FIG. 7 is a schematic drawing of an aerator module.

FIG. 7 represents one nonlimiting example of an aerator module 10. Contaminated liquid 13 enters the aeration tank 11 at liquid influent connection point 15. The contaminated liquid influent connection point 15 is located above the static contaminated liquid level in the aeration tank 10. However, in some embodiments, liquid influent connection point 15 can be located in other locations within the aeration tank 11. In some embodiments, the influent connection point 15 is located above the level of the contaminated water 13. This advantageously allows contaminated water 13 to be treated by aerator module 10 and transported away from aeration tank 11 at effluent connection point 45. In some embodiments, the contaminated water 13 may be sprayed into the aeration tank 11 to further increase the efficiency of removing contaminants from the contaminated water 13.

The aeration tank 11 is in communication with aeration compressor 20. Aeration compressor 20 is configured to deliver compressed gases to the aeration tank 11 by way of a gas distribution manifold 25. In some embodiments, aeration compressor 20 continuously delivers air or other gases into the gas distribution manifold 25. It may provide the selected gases, such as air, to the contaminated water 13 at a sufficient pressure to effect bubbling in the contaminated water 13 in aerator tank 11. In some embodiments, air may be delivered to the aeration tank 11 by a compressed air source. In some embodiments, gases such as ozone can be used in the purification of water during the aeration process. In some embodiments, aeration module 10 may also comprise an ultraviolet light purification system. In some embodiments, the air filter 60 is used to purify incoming air from the air compressor 20.

In some embodiments, the gas distribution manifold 25 may be attached to the bottom of the aeration tank 11. Aeration compressor 20 is connected to the aeration tank 11 via pipeline 66. Pipeline 66 connects to the gas influent connection point 55 near the base of aeration tank 11. Gas distribution manifold 25 may be further connected to the pipeline 66 to the gas influent connection point 55. In some embodiments, the pipeline 66 is fitted with a check valve 65, manual ball valve 70, and a pressure gauge 75. Check valve 65 is designed to prevent the flow of gas from the aeration tank 11 back through the aeration compressor 20. Manual ball valve 70 is closed it enables servicing of the aeration compressor 20 and check valve 65. Pressure gauge 75 indicates the clean air pressure entering the aeration tank 11. Manual ball valve 80 enables servicing of pressure gauge 75.

The gas distribution manifold 25 may comprise a plurality of pipelines which extend the length of the aeration tank 11. Gas distribution manifold 25 may be attached to the bottom of the aeration tank 10 or configured to be near the bottom of aeration tank 11. In some embodiments, the gas distribution manifold 25 comprises a plurality of orifices 30. In some embodiments, the gas distribution manifold is perforated with orifices several times per inch. The size of the orifices may vary depending on the application, and pressure. In some embodiments, the orifices are generally small in diameter. As the gas distribution manifold 25 is pressurized by the aeration compressor 20, gas exits the clean air distribution manifold 25 through orifices 30. Orifices 30 cause the gases, such as compressed air, to form small bubbles as the clean air exits the clean air distribution manifold 25 and enters the aeration tank 11. The small bubbles exit the clean air distribution manifold 25 and rise through contaminated liquid 13 in the aeration tank 11. As the bubbles rise through the contaminated liquid 13, some of the contaminant transfers from the contaminated liquid into the bubbles.

Aeration tank 11 may be made of different sizes, shapes and materials. In one embodiment, aeration tank 11 may be constructed of stainless steel or other materials suitable for containing the contaminated water 13. In some embodiments, aeration tank 11 may hold up to 1000 gallons of contaminated water, including about 50, 100, 200, 300, 400, 500, 600, 700, 800, 900 and 1000 gallons. Ranges between, below, and above such values gallons of are also contemplated.

Figure 8:
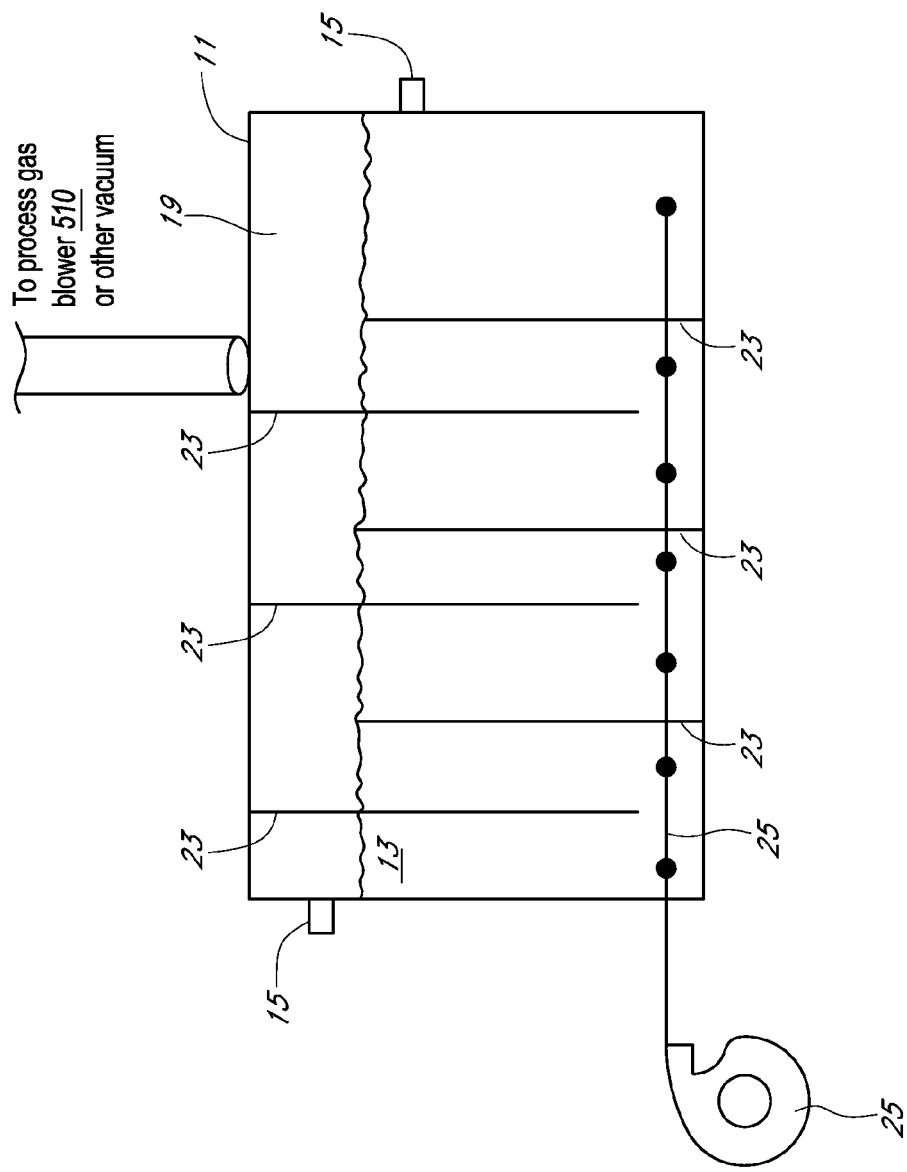
FIG. 8 is one nonlimiting embodiment of a baffled aeration tank module.

Referring to FIG. 8, in some embodiments, aeration tank 11 contains a series of internal walls or baffles 23. Contaminated liquid 13 enters tank 11 at influent connection point 15 and flows over and under the wall, which create a tortuous path for the water. The tortuous path increases the residence time of the contaminated liquid 13 in the aeration tank 11. Increasing the residence time allows for more contaminants in the liquid to transfer into the bubbles generated by the aeration compressor 20 and the gas distribution manifold 25. The contaminants are then transferred to the headspace 19 of tank 11. This is one method increasing the amount of contaminants that can transfer from liquid phase to gas phase while in the aeration tank 11. Once these contaminants are in the gas phase they are removed from the aeration tank 11 and destroyed by a contaminated gas treatment system.

Additionally, in some embodiments, walls are added to the aerator module to make the pathway for the water more tortuous, thereby increasing residence time. When the bubbles reach the surface of the contaminated liquid they collect in the headspace 19 at the top of the aeration tank 11. The aeration tank 11 may be fitted with an air tight lid 14 to prevent the gaseous contaminants from escaping into the atmosphere. In one embodiment, the head space 19 is connected to a vacuum pump. In another embodiment, head space 19 of aeration tank 11 is connected to the negative pressure side of the process gas blower 510 via a pipeline. The pipeline is fitted with an automatic vacuum control valve 51. The automatic vacuum control valve 51 ensures that a steady state vacuum is maintained in the headspace 19 of the aeration tank 11. In some embodiments, the gaseous contaminants travel into a contaminated gas phase treatment system 201. The contaminated gas phase treatment system may be specifically designed to oxidize, adsorb, and/or condense the target contaminants in the gas phase. Such gas phase treatment systems are further described herein.

Other means for increasing the residence time of the bubbles and the efficiency of the aerator tank may also be used. In another embodiment, the aeration tank or the water inside of the aeration tank may be heated. Without wishing to be bound to any particular theory, heating the aeration tank or the water inside of the aeration tank may increase the efficiency of the overall process of decontaminating the water. In some embodiments, a heat exchanger may be used to heat the contaminated liquid 13 prior to, during, or after the aeration tank module. In some particular embodiments, the heat exchanger may exchange heat given off by another component of the liquid decontamination system. For example, a heat exchanger may exchange heat from one or more of the contaminant treatment system, the vacuum pump, or the liquid transfer pump. In some embodiments, a heat exchanger may be a water to water heat exchanger, air to water heat exchanger, water to air heat exchanger, or air to air heat exchanger. In some embodiments, the water is heated to a temperature ranging between about 50 to about 105° F. In another embodiment, the water is heated to a temperature ranging between about 80 to about 100° F.

In addition, the vacuum pressure maintained in the aeration tank may also be controlled. In some embodiments, the vacuum pressure is static and produced a vacuum. In some embodiments, the vacuum is dynamic. In some embodiments, the pressure is lower than atmospheric pressure. In some embodiments, the pressure is about 680 to 760 Torr. In some embodiments, the pressure is about 740 to about 760 Torr. In some embodiments, the vacuum pressure is dependent on the temperature of the contaminated liquid 13.

In one embodiment, the aeration tank 11 will receive contaminated gases directly from a contaminated source. These gases may or may not be dissolved in a contaminated liquid 13. For example, it will be understood to those having ordinary skill in the art that the liquid decontamination systems described herein may operate in a dual phase capacity. As such, the contaminated gases delivered to the aeration module 10, or any other module of the water decontamination system, may pass directly to the contaminated gas treatment system 201 by the delivery means as described herein. In one embodiment, the effluent connection inlet is configured to be above the contaminated water level such that the contaminated gases, which are delivered to the aeration module, pass directly to the headspace 19 of the aeration tank 10. From the headspace 19, the contaminated gas phase may be delivered to the contaminated gas treatment system 201 via the vacuum or other means.

In some embodiments, the aeration module 10 may be operated continuously and/or automatically. In one embodiment, aeration tank 11 is equipped with liquid level control 35 and a high level alarm shut down switch 85. As contaminated liquid fills the aeration tank 11 the contaminated liquid level is continuously monitored by liquid level control 35. At a field settable contaminated liquid level the liquid level control 35 activates and sends a pump start signal to a programmable logic controller in a control panel. The programmable logic controller then sends a signal to start contaminated liquid transfer pump 90. While the foregoing is described as a programmable logic controller, other manual and automatic means of signaling the transfer pump are known and are contemplated herein. Such automated systems are also further described herein. As discussed further herein, such operation may be accomplished by a float switch.

In one embodiment, contaminated liquid transfer pump 90 starts and pumps the contaminated liquid 13 away from the aerator tank 11. Contaminated liquid transfer pump 90 may pump the contaminated liquid to one or more other treatment modules of the water decontamination system, such as the filtration system or the separator tower. If the contaminated liquid transfer-pump 90 fails to start, or fails to prime, or if the aeration tank 10 is filling too rapidly, the contaminated liquid level will continue to rise in aeration tank 10. The rising contaminated liquid level in aeration tank 10 will eventually reach the high level alarm float switch 85. At the high level alarm point the high level alarm float switch 85 activates and sends a signal to the programmable logic controller in the control panel. The programmable logic controller then shuts down the system and stops the flow of contaminated liquid into aeration tank 10.

Figure 8A:
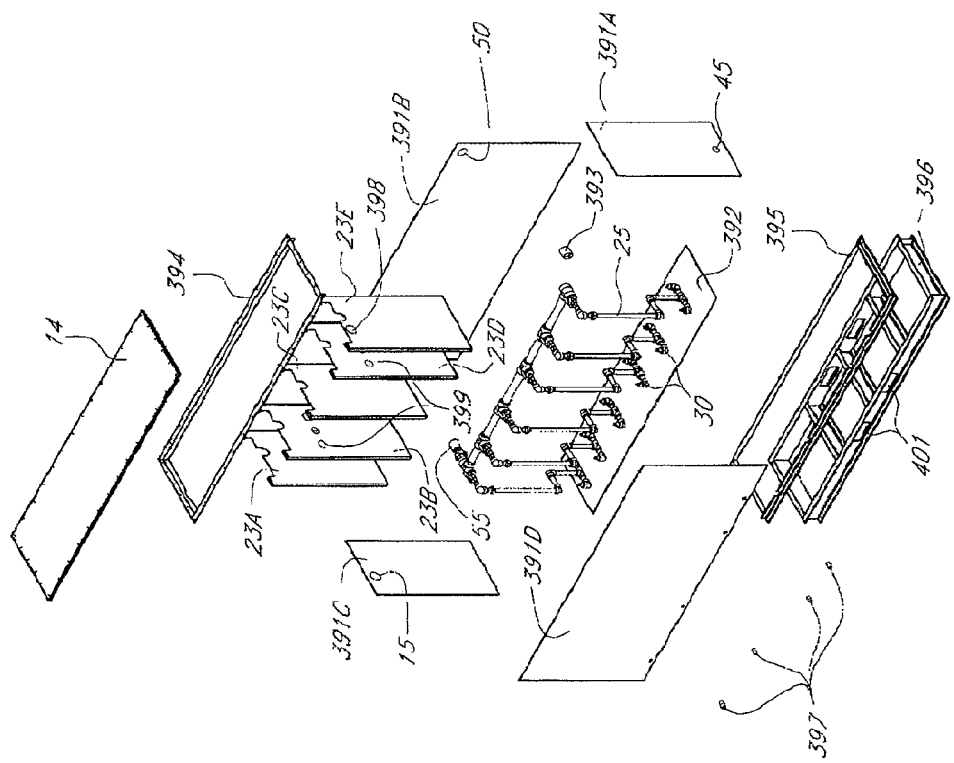
FIG. 8A is an exploded view of an aerator module.

FIG. 8A shows an exploded view of one configuration of an aerator module. Aerator tank 11 is made from four side walls, 391A, 391B, 391C, 391D and bottom wall 392. The walls may be attached together by any means to form a box, including, but not limited to, being welded together on the respective sides of each wall. Side wall 391C includes an influent connection point 15 in which contaminated water is allowed to pass into aeration tank 11. Side wall 391A includes effluent connection point 45 in which contaminated water is allowed to pass away from the aeration tank. Side wall 391B includes opening contaminated gas effluent connection point 50. Side wall 391D may be outfitted with drain valves 397 to allow drainage of the aeration tank 11.

Placed within the tank formed by the side walls 391A-D and the bottom wall 392 are the gas distribution manifold 25. The gas distribution manifold 25 includes the gas influent connection point 55, which may be connected to an air compressor, or other gas delivery system. Gas distribution manifold comprises a plurality of orifices 30, which are 0.5 inch half nipples. However, as discussed above, the size of the orifices 30 may vary.

Also within the aeration tank are baffles 23A, 23B, 23C, 23D, and 23 E. These baffles create a tortuous path for the water as it enters the aeration tank 11. As shown, some baffles, such as baffles 23B, 23D, and 23E may contain openings 399, 398 for water to pass through as the water fills each respective chamber of the aeration tank. Alternatively, the baffles, such as baffles 23A and 23C may be oriented to allow water to pass under the baffles. The orientation of the respective chambers is further shown in FIG. 8B

As previously noted, the aeration tank 11 may operate under vacuum. Flange 394 may be welded to side walls 391A, 391B, 391C, and 391D. In some embodiments, the flange may also be welded to the baffles 23A, 23B, 23C, and 23D. Air tight lid 14 may be bolted to flange 394. In some embodiments, the air tight lid 14 is made of steel.

Furthermore, in some embodiments, the bottom wall 392 may be attached to flange 395, which is then further connected to base 396. Base 396 allows for the aeration tank to not be placed on the ground. Base 396 also includes slots 401 which allow the aeration tank 11 to be easily moved by equipment that can manipulate the base using the slots, such as a forklift.

As an illustration, water that enters the aeration tank 11 at influent connection point 15 must pass under baffle 23A. At the same time, compressed air may be pumped into the aeration tank 11 via the manifold 25 and orifices 30. As the water fills the tank 11 from the influent connection point 15, the water will rise to a level such that it reaches the height of openings 399 in baffle 23B. Water then will fill the next chamber of the aeration tank and then be forced under baffle 23C and into the next chamber. The level of the water will then rise to the height of the openings 399 of baffle 23D and pass through the openings 399 of baffle 23D. After passing baffle 23 D, water then must fill the next chamber before reaching opening 398. As shown in the figure, the water will then fill the final chamber of the aeration tank 11. Water then may be removed by way of effluent connection point 45 in side wall 391A. In some embodiments, the last chamber may be outfitted with a float switch or other mechanism which automates the liquid transfer pump 90 and removes the contaminated water by way of liquid effluent connection point 45.

FIG. 8B presents a front view of the aeration tank from FIG. 8A. As shown the aeration tank may be divided into multiple chambers by baffles 23A, 23B, 23C, 23D, and 23F. As shown, baffles 23A and 23C are not connected to bottom wall 392, which allows water to pass under baffles 23A and 23C. As further shown baffles 23B, 23C, 23D are contact bottom wall 392 and top lid 14, allowing water to only pass through openings in the respective baffle. Gas distribution manifold 25 may be configured to pass through each respective baffle at a different opening than the water passes through. Further, gas distribution manifold 25 possesses a number of appendages which deliver air to the respective chambers through orifices 30.

Referring to FIG. 8B, the chambers as divided by baffles 23A, 23B, 23C, and 23D. The chambers may be equal or different sizes. In one embodiment, each of lengths a, b, c, d, e, and f independently ranges from about 6 to about 40 inches. In one embodiment, each length a, b, and e is about 12 inches, each length c and is about 18 inches, and length e is about 28.5 inches. However, these lengths may vary according to the size, dimensions, and desired flow rates of the contaminated water. Height g may range from about 30 to about 60 inches. In some embodiments, height g is about 50 inches.

Referring to FIG. 8C, this side view of aerator tank 11 shows the manifold 25 which delivers air through orifices 30. It also shows openings 399 in a baffle. In some embodiments, length i ranges from about 20 to about 40 inches, including about 25, 26, 27, 28, 29, 30, 31, and 32 inches. Furthermore, a top view of the aerator tank 11 is shown in FIG. 8D. Length h may range from about 60 to about 150 inches. In some embodiments, length h is ranges from about 80 to about 120 inches. In one embodiment, length h is about 100 inches.

Various embodiments of baffled aeration tanks are further described herein. While it has been discussed that the aeration tanks may be used with one or more other components of the system, it is also understood that the aeration tank may be used alone or used with different types of equipment described herein. According to some embodiments, a substantial amount of purification may occur within the aeration tank alone, thus allowing for the elimination of one or more other purification steps.

In some embodiments, a baffled aeration tank comprises an inlet for introducing a contaminated liquid to the tank and an outlet for outputting an output liquid having less contaminants than the contaminated liquid. The location of the inlet and outlet can be varied according to the exact specifications. In some embodiments, the inlet may be located at the bottom or base of a first chamber of the aeration tank. In other embodiments, the inlet is located at the top or lid of a first chamber of the aeration tank. In another embodiment, the inlet is located in a side wall of the first chamber of the aeration tank. If side wall inlets are used, the inlet height may be varied. For example, it is preferable to locate the side wall inlet at a location proximate to the top of a countercurrent flow chamber such that the water must travel toward the bottom of the chamber. According to some embodiments, a gas source is located in the bottom of such countercurrent chamber, thus allowing for water to flow toward such gas source assuming that the subsequent chamber is a current flow chamber.

According to some embodiments, an aeration tank comprises a lid for preventing gaseous contaminants from the contaminated liquid to escape to an atmosphere surrounding the tank. In some embodiments, such lid is gas tight to maintain a negative pressure within the tank.

According to some embodiments, an aeration tank is divided into a plurality of chambers. Each chamber is divided from other chambers by one or more baffles or walls. In some embodiments, a plurality of first type and second type partitions are disposed between the inlet and the outlet of the tank. In some embodiments, The first type of partitions extend from a position on or proximate to the lid of the aeration tank to a level above bottom of the tank, thus allowing for a gap for water to flow under such first type partition. As discussed herein, some embodiments of the tank comprise a head space that is fluidly connected in each chamber of the aeration tank. Thus, a gap or other opening may be left in the first type partition to allow for such fluid communication of the head space from chamber to chamber. In an alternative embodiment, the first type partition may extend to the bottom or a position proximate to the bottom of the tank. In some embodiments, the first type partition may also comprise openings such as holes or slots through which the water may pass to a subsequent chamber.

In some embodiments, one or more second type partitions may extend from the bottom of the tank to the lid or to a position proximate to the lid of the tank. In some embodiments, the second type partitions may comprise openings at the bottom of the headspace for water to pass through to a subsequent chamber. The height in the gap (whether an opening or the top of the second type partition) in the second type partition typically defines the headspace, as water will proceed to the next chamber instead of continuing to rise in height. In some embodiments, the gap in the second type partition is located above the at least one gas output in the adjacent chamber.

In some embodiments, such first and second type partitions are alternating within the aeration tank. Such alternating arrangements create a sinuous or serpentine type flow of the water from one chamber to the next. However, in some embodiments, one or more first type partitions may be placed prior to or subsequent to another first type partition. Moreover, in some embodiments, one or more second type partitions may be placed prior to or subsequent to another second type partition.

As discussed above, one gas output may be located within each chamber of the tank. However, some embodiments include gas outputs in only current flow type chambers or counter current flow type chambers. In one embodiment, at least one gas output is located within the last chamber of the tank relative to the flow of the water through the baffled tank.

In some embodiments, the tank comprises a headspace. The headspace provides a space for the collection of contaminated gases from the contaminated liquid, as well as gas that is bubbled through the water. In some embodiments, the headspace comprises a vent to vent such contaminated gases or gas that is bubble through the water. In some embodiments, the vent transports the contaminated gas to a treatment system. In some embodiments, the vent is fluidly connected to a vacuum or a process blower to provide a negative pressure to remove the gaseous contaminants from the headspace. While a high vacuum may be used, it has been discovered that a slight vacuum, such as that created from a process blower of an oxidation system is sufficient to remove the gaseous contaminants at high efficiencies.

In some embodiments, the aeration tank has a bottom and side walls and a top defining a volume of the tank. In some embodiments, the side walls may be rounded or flat. In some embodiments, the plurality of chambers defined by the walls and/or the partitions (noting that the walls may also act as partitions). In some embodiments, the chambers comprise the total volume of the tank.

According to some embodiments, the size of each chamber, whether counter current or current flow chambers may be varied. In some embodiments, it is preferable to increase the volume of the countercurrent flow chambers. In turn, an increase in volume will increase the residence time of the contaminated water in countercurrent flow chambers. As water is flowing against the flow of bubbles from the gas output in such chambers, it experiences more turbulence. Advantageously, this allows for increased purification efficiencies in such countercurrent chambers having an increased volume.

In some embodiments, the volume of the chambers may be varied by placement of the first type and second type partitions within the aeration tank. In some embodiments, the distance between the first inlet side and the first outlet side of the countercurrent flow chamber is greater than the distance between the second inlet side and the second outlet side of the current flow chambers. In some embodiments, such distance between the partitions of the countercurrent flow chamber is 1 to about 4 times the distance between the partitions of the current flow chambers. In some embodiments, each of the countercurrent flow chambers have the same volume, while in other embodiments, one or more countercurrent flow chambers have different volumes. Likewise, in some embodiments, each of the current flow chambers have the same volume, while in other embodiments, one or more current flow chambers have different volumes.

Figure 8E:
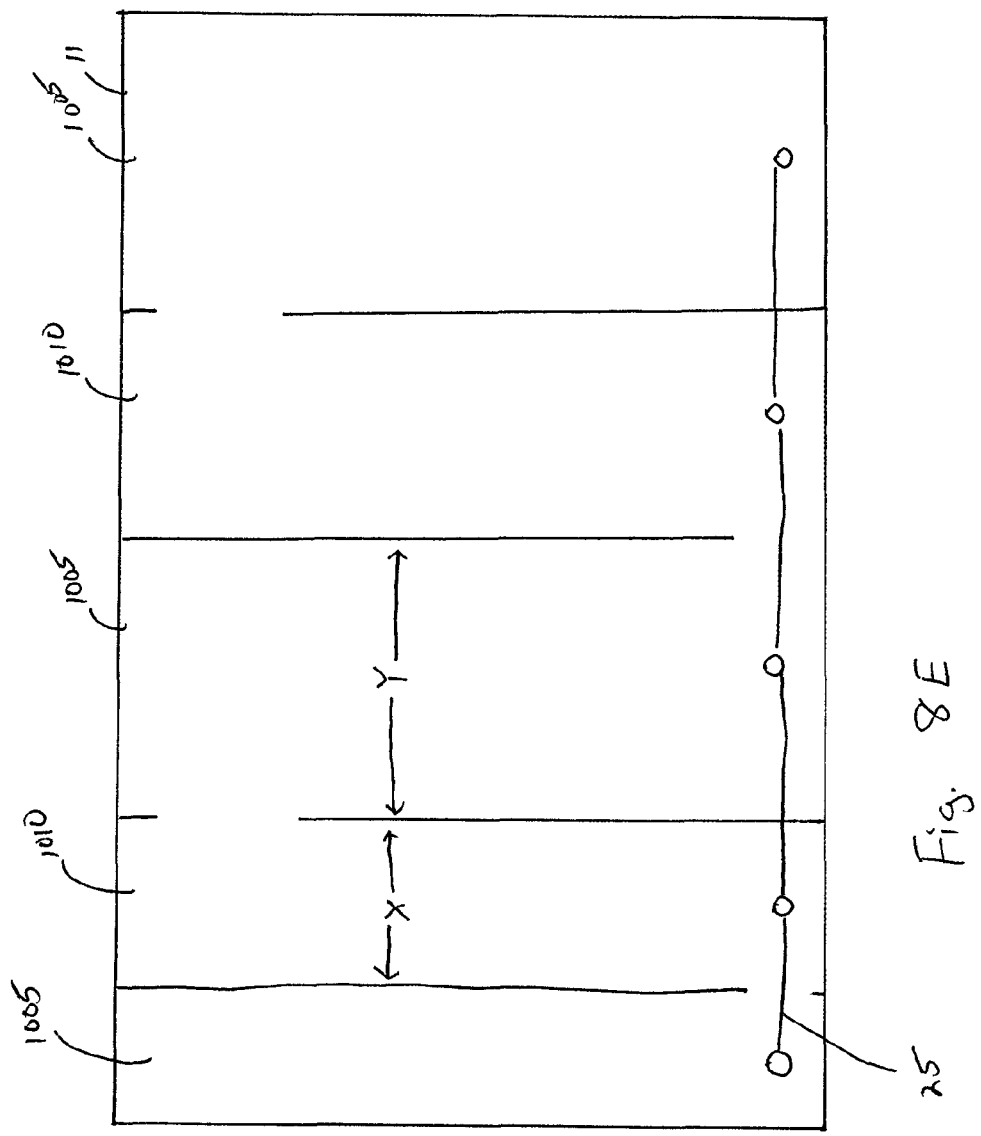
FIG. 8E is another nonlimiting embodiment of a baffled aeration tank module.

Referring to FIG. 8E, an aeration tank 11 is divided into a plurality of current flow chambers 1005 and countercurrent flow chamber 1010. The current flow chambers have a distance X between the partitions defining the volume of the chamber. Likewise, the countercurrent flow chambers have a distance Y between the partitions. In some embodiments, distance X is less than distance Y for at least some of the current flow chambers. In some embodiments, distance Y is 1.1 to about 4 times greater than distance X. In some embodiments, the volume of countercurrent flow chambers may be varied accordingly by changing the location of the partitions and/or varying the sidewalls of the chamber. In a particular embodiment, distance X is between about 0.5 to about 2 feet and distance Y is about 1.4 to about 8 feet. However, the distances may be scaled according to flow rate, volume of water to be purified, and the size of the tank necessary for the individual application.

Referring to FIG. 8F, one embodiment comprises the at least one current flow chamber is positioned between two countercurrent flow chambers. In another embodiment shown in FIG. 8G, the at least one countercurrent flow chamber is positioned between two current flow chambers. FIG. 8H represents another nonlimiting embodiment of an aeration tank have a plurality of current and countercurrent chambers. While each chamber is shown as having a gas output, it is possible that one or more chambers do not have such a gas output. For example, in FIG. 8I, one embodiment of an aeration tank has gas outputs in only countercurrent chambers. As can be seen in relative spacing of the partitions in the tank, countercurrent flow chambers may have a larger volume than current flow chambers.

While the aeration tank can be operated in a continuous manner where flows through the inlet is approximately equal to flow through the outlet, it is sometimes desirable to operate the aeration tank in a batch mode. In some embodiments, such float switch may be operationally connected to the outlet for opening and closing a valve which allows for removal of the output liquid from the tank. In some embodiments, the float switch is operationally connected to a transfer pump for removing output water from the outlet when water reaches a predetermined high level in the chamber. In some embodiments, the float switch is operationally connected to a pump for stopping the removal of output water when water reaches a predetermined low level in the chamber.

In some embodiments, the aerator module may be operated in a continuous type fashion. For example, aerator module may comprise an inlet flow regulator for regulating the input rate of the contaminated water into an inlet of the aeration tank. Such inlet flow regulator may be one or more of a pump, a filter, a valve, or other means of varying rate of contaminated liquid flow into the tank. Likewise, an outlet flow regulator may be operationally connected to the water outlet of the aeration tank. Such outlet flow regulator may be one or more of a pump, a filter, a valve, or other means of varying rate of purified liquid flow away from the tank. In some embodiments, the input rate is greater than or less than the output rate. In certain embodiments, the input rate is approximately equal to the output rate.

In certain embodiments, batch mode operations may be used to maintain the continuous process. For example, when the initial contaminated water enters such tank, it may not be necessary to remove purified water from the last chamber until a certain amount of water is present in such chamber. A float switch may be used to operate the transfer of water out of the chamber when such water reaches a predetermined level. Once activated, it may be possible to maintain the continuous flow of water through such chamber based on the inlet and outlet flow rate.

In some embodiments, at least one gas output in a chamber comprises a gas diffuser. In certain embodiments, the gas output in the chamber may be uniformly distributed by one or more nozzles and/or diffusers. The actual number of nozzles or diffusers may varied in accordance with the amount and uniformity of air need for treatment.

In certain embodiments, it may become necessary to remove solids from the bottom of the aeration tank chambers. In some embodiments, one or more of the chambers comprise a valve, an opening, a hatch, or a port for removing solids from the bottom of the chamber.

Figure 9:
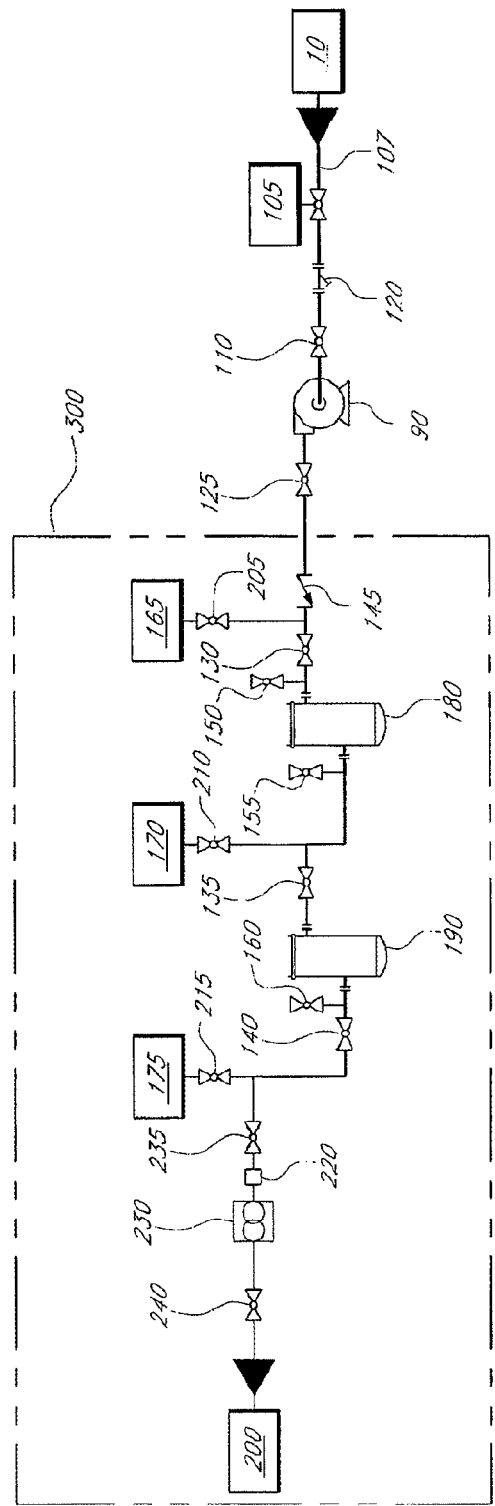
FIG. 9 is a schematic drawing of a filter module and also shows a liquid transfer pump.

Although the aerator module has been disclosed in the context of certain embodiments and examples, it will be understood by those skilled in the art that other embodiments of the aerator module extend beyond the specifically disclosed embodiments to other alternative embodiments and/or uses and obvious modifications and equivalents thereof. Accordingly, the aerator module is not intended to be limited by the specific disclosures of preferred embodiments herein.
Transfer Pump & Filter Module As discussed above, some embodiments of systems may include a transfer pump 90 to transfer contaminated water from one component to another. Referring to FIG. 9, in one embodiment, transfer pump 90 may transfer contaminated water from aeration module 10 to a filtration module 300. Contaminated liquid transfer pump 90 may be connected to aeration tank 10 by pipeline 107. In one embodiment, the pipeline 107 is connected to the aeration tank 10 near the bottom of the final chamber at the effluent connection point 45.

In some embodiments, the pipeline may be equipped with ball valves 105 and 110 and y-strainer 120 located on the upstream side of the contaminated liquid transfer pump 90. Closing the ball valves 105 and 110 enables servicing of y-strainer 120. Y-strainer 120 is designed to remove solid particles larger that twenty microns from the contaminated liquid. However, other filters may be used in place of Y-strainer 120. In some embodiments, no filter is necessary because the contaminated water was prefiltered. Filtered water prevents damage to the contaminated liquid transfer pump 90. However, the sizes of the filter may vary and solid particles can be larger or smaller than about 20 microns, including about 5, about 10, and about 15 microns can be removed.

Contaminated liquid transfer pump 90 may be any type of pump. In one embodiment, contaminated liquid transfer pump 90 is a centrifugal pump. To obtain continuous flows, a five horsepower pump may be used for 10-15 gpm system. A larger pump may be used on a system with increased flow and production rates of water. Thus, the size and power of the contaminated liquid transfer pump may vary according to the total output of the liquid decontamination system. One example of a suitable transfer pump is the Transfer Pump, 1.5HP, TEFC, 3 Phase, available from Price Pump Co. (Part No. CD100BF-450-6A212-150-353T6). Another suitable transfer pump includes are Gould Pumps (G&L Series Model NPR/NPE-F), available from ITT Water Technology, Inc.

Suitable liquid transfer pumps may increase the water pressure up to amount of about 200 PSIA, including pressures of about 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, and 200 PSIA. Pressure also include ranges between the foregoing values. As used herein, "PSIA" means pressure per square inch, absolute being at 0° K.

In one embodiment, ball valves 110 and 125 are located upstream and downstream of the contaminated liquid transfer pump 90 to enable servicing of the contaminated liquid transfer pump 90.

Further referring to FIG. 9, the contaminated liquid transfer pump 90 is connected to the separator tower 200 by a pipeline. As shown in the embodiment of the figure, the pipeline is equipped with four ball valves 125, 130, 135, 140, one check valve 145, three sample ports 150, 155, and 160, three pressure gauges 165, 170, and 175, and two filter housings 180 and 190. Check valve 145 is designed to prevent the back flow of liquid from the separator tower 200 to the aeration tank 10. Ball valves 125 and 130 enable servicing of check valve 145.

As further noted in FIG. 9, the contaminated liquid transfer pump 90 may transfer the contaminated water 13 to a filtration module 300. Filtration module 300 may include one or more filters to reduce contaminants from the contaminated water. In some embodiments, the filtration module may be equipped with at least one filter housing. In other embodiments, the filter module is fitted with more than two filter housings. These filter housings may be used in series or may be used separately for two different sources of water. One nonlimiting example of a filtration module is shown in FIG. 9. In this example, the filtration module includes primary filter housing 180 and secondary filter housing 190. Each of primary filter housing 180 and secondary filter housing 190 may include a solid filter element. In some embodiments, each of primary filter housing 180 and secondary filter housing 190 may be equipped with about 5 to about 25 micron filter element. In one embodiment, the primary filter element 180 is equipped with a 10 micron filter element and the secondary filter housing 190 is fitted with a five micron filter element. In some embodiments, the filters can filter particles of different sizes or the same size. The particles which may be filter includes particles having a size of greater than or equal to about 1, 2, 3, 4, 5, 6, 7, 8, 9, or 10 microns. An example of suitable filters and filter housings include Model NCO Bag of Cartridge Filter Housings available from Rosedale Products, Inc. (Part No. NCO8-15-2P-*-150-C-V-PB).

Referring to FIG. 9, some embodiments include ball valves 130 and 135 which enable servicing of primary filter housing 180, and ball valves 135 and 140 which are upstream and downstream of secondary filter housing 190. In some embodiments, pressure gauges 165 and 170 are used to determine the service interval of the bag filter elements in primary filter housing 180, and pressure gauges 170 and 175 are used to determine the service interval of the bag filter element in the secondary filter housing. The difference between the upstream pressure gauge and downstream pressure gauge readings indicates the condition of the bag filter element in primary filter housing 180. Ball valves 205, 210 enable servicing of the pressure gauges. Balls valves 135 and 140 enable servicing of secondary filter housing 180. Ball valves 140 and 235 enable servicing of 175.

Continuing to refer to FIG. 9, some embodiments include sample ports 150, 155, and 160. In these embodiments, sample ports 150, 155, 160 enable the collection of contaminated liquid samples. Such samples are used to determine the effectiveness of the system and process. In addition, filtration system 300 may be equipped with a contaminated liquid temperature gauge 220 and a contaminated liquid flow meter 230. Ball valves 235 and 240 enable servicing of the contaminated liquid flow meter 230.

Separator Tower Module

One effective mode of removing contaminants such as VOCs or halogenated organic compounds from water is through an airstripping process. In some embodiments, the water decontamination system includes a separate tower module 200. In some embodiments, the separator tower 200 acts an air stripper which produces a phase change of contaminants which are dissolved in the contaminated water. At least some of the contaminants in the contaminated water change phases from liquids to gases in the separator tower 200. In some embodiments, contaminated liquid is pumped into the separator tower 200 near the top of separator tower 200. Spray nozzles 260 create small droplets of contaminated liquid which increases the amount of surface area of contaminated liquid exposed to the dilution air. The atomized contaminated liquid is then exposed to reduced pressures in separation tower 200 and the contaminants change from liquid to gas phase. As the small droplets of contaminated liquid fall in separator tower 200, the contaminants change phase Referring to FIG. 10, in some embodiments, the contaminated water is sprayed through a plurality of spray nozzles 260 into the separator tower 200 which is under vacuum. The plurality of spray nozzles 260 may comprise atomizing spray nozzles. Spray nozzles 260 may be configured and arranged as to provide an efficient conversion of the contaminated liquid into a contaminated mist.

Figure 11:
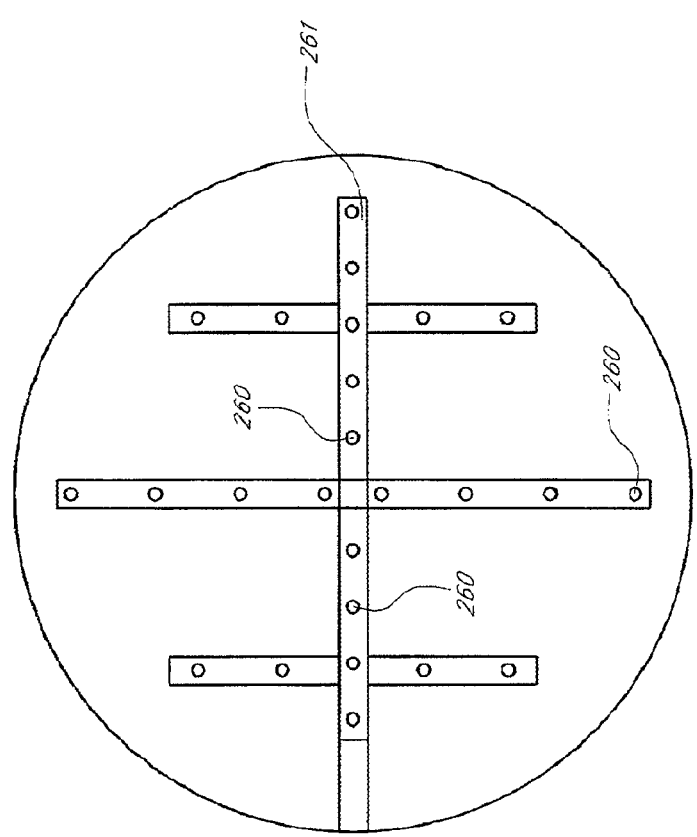
FIG. 11 is a schematic drawing of the arrangement of the plurality of nozzles inside of the separator tower.

For example, FIG. 11 demonstrates one arrangement of spray nozzles 260 in separator tower 200. Spray nozzles 260 are arranged on a spray nozzle manifold 261. In some embodiments, spray nozzle manifold is in fluid connection with influent connection point 250. Spray nozzle manifold may come in many different configurations. In one embodiment, the spray nozzle manifold comprising the plurality of nozzles may be located on a cartridge. Such a cartridge may be replaceable in the separator tower 200

In some embodiments, separator tower 200 comprises about 20 to about 40 atomizing spray nozzles 260. In some embodiments, separator tower 200 comprises about 10 to about 50 atomizing spray nozzles 260. In some embodiments, spay nozzles 260 are located at near the top of separator tower 200 and spaced evenly apart from one another. Suitable spray nozzles 260 include nozzles having a size of about 4 to about 5 microns. The size however is variable as noted above and is not limited to the described sizes, and also includes from about 1 to about 5 micron sized nozzles, and from about 5 to about 20 micron sized nozzles.

The pressure of the atomized contaminated water at the plurality of nozzles may be varied according to flow rate of the contaminated water, the number of nozzles, and the size of the orifices of the nozzles. In some embodiments, the pressure of the fluid at the nozzles is between about 10 to about 150 PSIG. In some embodiments, the pressure of the fluid at the nozzles is between about 20 to about 80 PSIG. In some embodiments, the pressure of the fluid at the nozzles is between about 40 to about 65 PSIG.

In some embodiments, the nozzles 260 of the separator tower 200 may be optionally heated. Methods of providing heat to the spray nozzles 260 are known in the art. One method comprises providing electricity to the nozzles while grounding the nozzles 260 to eliminate any charge. The nozzles may also be attached to a thermocouple to control heating of the nozzles.

In one embodiment, a vacuum pump 510 is adapted to connect to the separator tower 200 near the top of the separator tower 200 at the effluent connection 475. In one embodiment, the spray nozzles are placed at a level below the vacuum inlet 475. In one preferred embodiment, the vacuum inlet 475 is about 2 to about 7 inches below the top of the separator tower. In this embodiment, the spray nozzles are about 2 to about 10 inches below the vacuum inlet. In some embodiments, the spray nozzles may be located further below the vacuum inlet than then prescribed ranges.

Figure 10:
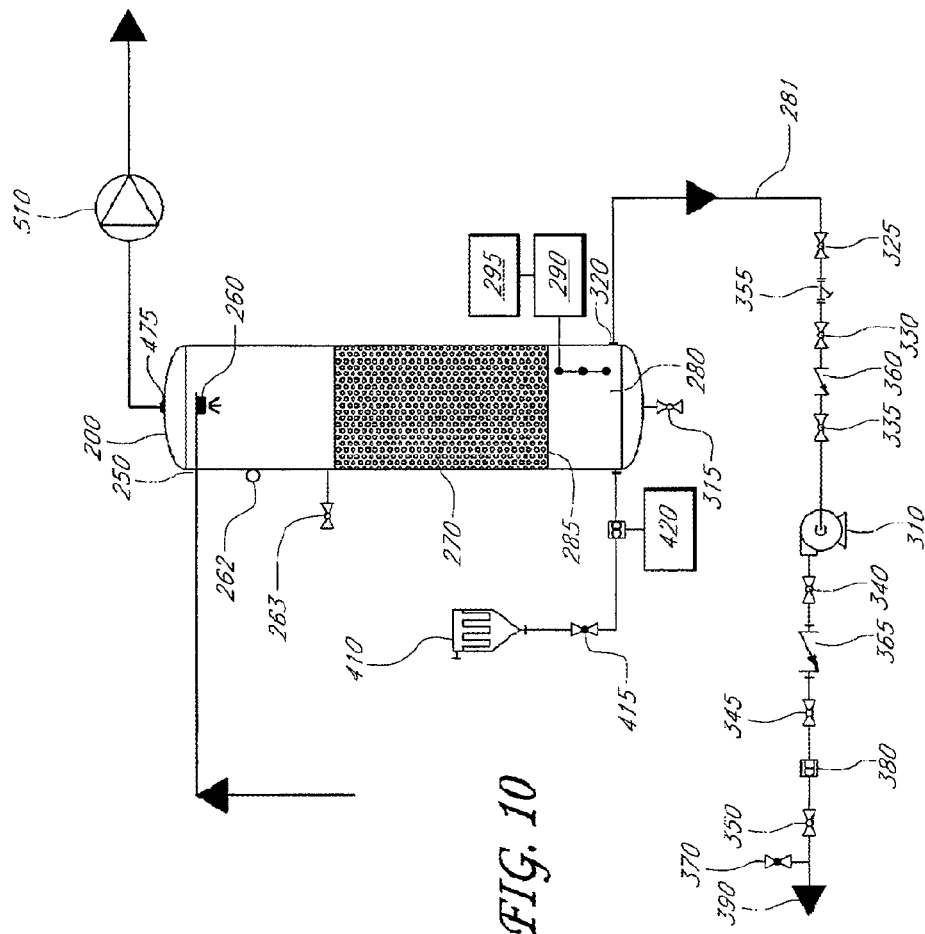
FIG. 10 is a schematic drawing of a separator tower module.

In some embodiments, a static or dynamic vacuum is maintained inside of separator tower 200 by vacuum pump 510. In one embodiment, a dynamic vacuum is preferred. A high vacuum can reduce the pressure of the separate tower module 200 to provide a low energy, high vacuum environment to assist in the interphase transfer of the contaminants. The reduced pressures in the separator tower 200 increase the volatility of the contaminants in the contaminated water. In some embodiments, separator tower 200 is operated under a high vacuum. The exact pressure of the chamber may vary depending on the contaminants. In some embodiments, the pressure is about 27 inches of Hg, but this may vary. In some embodiments, the pressure is about 10 to about 40 inches of Hg. In some embodiments, the separator tower operates under a high vacuum. Referring to FIG. 10, ball valve 415 may be manipulated to obtain the proper operating pressure of the separation tower 200 at pressure gauge 263. Pressure gauge 263 may also be controlled automatically by a programmable logic controller on the control panel or read manually.

In some embodiments, carrier or dilution air can be passed over the contaminants to transfer as much of the contaminants from the liquid phase to the gaseous phase. The contaminated gas phase may mix with the dilution air prior to, during, or after the phase change of the gaseous contaminants. In some embodiments, the rate of dilution air can be controlled to increase the efficiency of the transfer of the contaminants from the liquid to the gas phase. In some embodiments, the dilution air flow rate may be varied from about 0.1 to about 20 SCFM. In some embodiments, the dilution air flow rate may be varied from about 0.5 to about 15 SCFM. In some embodiments, the dilution air flow rate may be varied from about 1 to about 10 SCFM. The dilution air may be maintained at any flow rate value between the aforementioned rangers. The term "SCFM" means Standard Cubic Feet per Minute, referenced to a pre-specified pressure, temperature, and relative humidity. As used herein, SCFM is referenced to 14.7 PSIA, 68° F., and 0% relative humidity. Alternatively in some embodiments, dilution air is not required to effect transfer of the contaminants from the liquid phase to the gas phase.

Referring to FIG. 10, in one embodiment, dilution air enters the separator tower 200 at the dilution air filter 410. The flow rate of the dilution air may be controlled manually or automatically. For example, the dilution air may be controlled by a programmable logic controller in the control panel. In some embodiments, ball valve 415 is used to control the flow of dilution air into separator tower 200. In some embodiments, dilution air flow meter 420 indicates the flow rate of dilution air entering the separator tower 200.

In one embodiment, dilution air enters the separator tower 200 near the mid point of sump 280 However, other embodiments allow for the dilution air to enter the separator tower at other locations in the sump 280 or above the sump 280. Dilution air flows up through the sump 280, optional random packing 270 and mixes with the contaminated gas phase. Once the dilution air mixes with the contaminated gas phase, the mixture continues upward in separator tower 200 to the process gas effluent connection 475. Upon exiting the separator tower 200 the process gas passes through the vacuum pump 510 and process gas blower and enters the contaminated gas phase treatment system 201.

In some embodiments, the residence time of the atomized contaminated water may be increased by filling the separator tower 200 with optional random packing 270. Random packing 270 increases the amount of surface area inside the separator tower 200. One or more supports may be used in the separator tower to support such packing material. Random packing support grid 285 may be installed to prevent the random packing from falling into the separator tower sump 280. Examples of suitable packing include Jaeger Tri-Packs®, but are not limited thereto. In some embodiments, no packing is used.

In some embodiments, the contaminated water may be heated to further increase the efficiency of the phase change of the contaminants in separator tower. In some embodiments, the water may be heated by the spray nozzles. In other embodiments, the water is heated prior to entering separation tower 200. In some embodiments, the water is heated from heat from other components of the water decontamination system, such as a heat exchanger on the one of transfer pump (e.g., transfer pump 90), vacuum pump 510, or contaminated gas treatment system 201. In some embodiments, the temperature of the contaminated water may be maintained in the range from about 40 to about 150° F. In some embodiments, the temperature of the contaminated water may be maintained in the range from about 60 to about 110° F. In some embodiments, the temperature of the contaminated water may be maintained in the range from about 70 to about 100° F.

As noted above, the dimension of the separator tower module may vary with the type, amount and concentration of contaminant(s), the volume of water to be processed by the separator tower, the desired flow rates through the device, and the desired pressures in the vacuum chamber of the separator tower. In some nonlimiting embodiments, the separator tower is a cylindrical. In some embodiments, the separator tower has a storage capacity of about 20 to about 5000 gallons of liquid. In some embodiments, the storage capacity of the separator tower is about 100 to about 1000 gallons. In another embodiment, the storage capacity of the separator tower is about 80 to about 200 gallons. In a preferred embodiment, the separator tower has a capacity of about 100 gallons.

The shape and dimensions of the separator tower may vary. In one embodiment, a cylindrical separator tower module is about 3 to about 20 feet tall (1 meter to about 6 meters). In another embodiment, the separator tower is about 6 to about 30 feet tall (2 meters to about 10 meters). In one preferred embodiment, the separator tower is about 12 feet tall.

As the separation process occurs in the separator tower 200, purified water comprising less contaminants than the contaminated water falls to the bottom of the separator tower 200. In some embodiments, the cleaned water may be produced at a rate of between about 1 to about 20 gpm. In some embodiments, the cleaned water is produced at a rate of between about 5 to about 15 gpm. In some embodiments, the cleaned water is produced at a rate of about 10 gpm. However, different configurations and scale of the liquid decontamination system may allow for production of water at rater rates than 10 gpm, including up to about 200 gpm.

In some embodiments, the cleaned water collects and begins to fill sump 280. Sump 280 can be drained and/or pumped out. This process can occur continuously or in a batch process. This process may also occur manually or automatically. In some embodiments, sump 280 may be equipped with a manual drain valve 315 to drain the cleaned water from the sump. In other embodiments, cleaned water effluent connection 320 is located near the bottom of the sump 280. Cleaned water effluent connection 320 is connected to the clean liquid transfer pump 310 by a pipeline 281.

In some embodiments, sump 280 of separator tower 200 may be equipped with a pump down float switch 290 and a high liquid alarm float switch 295. The rising liquid level in sump 280 is monitored by the pump down float switch 290, which may be monitored manually or automatically. In one embodiment, the float switch activates at a field settable clean water level, and sends a start signal to cleaned water transfer pump 310. These switches and pumps may be monitored and/or activated by a programmable logic controller in the control panel. If the cleaned water transfer pump 310 fails to start, fails to prime or fails to pump and the cleaned liquid level continues to rise in the separator tower sump 280 the cleaned liquid level will eventually reach the high level alarm point 295. At the high level alarm point 295, the high level alarm float switch activates and sends a signal to the programmable logic controller in the control panel to shut down at least a part of the process.

In some embodiments, pipeline 281 is fitted with one or more ball valves 325, 330, 335, 340, 345, 350, one or more y-strainer 355 and one or more check valves 360, 365, one or more sample ports 370 and one or more clean water flow meter 380. Y-strainer 355 may be used to remove solid particles, including those larger than twenty microns. Ball valves 325 and 330 allows for servicing of y-strainer 355. Check valve 360 is designed to prevent cleaned water from flowing back into separator tower 200. Check valve 365 is designed to prevent clean liquid from flow back into the cleaned water transfer pump 310. Ball valves 330 and 335 allows for servicing of check valve 360. Ball valves 335 and 340 allows for servicing of cleaned water transfer pump 310. Ball valves 340 and 345 allows for servicing of check valve 365. Ball valves 345 and 350 allow for servicing of the clean liquid flow meter 380.

In some embodiments, cleaned water effluent connection 390 may be connected to a holding tank, storm drain or other method of controlling the clean liquid pumped out of system. In some embodiments, the cleaned water may be recycled to one or more components of the water decontamination system. In one embodiment, the cleaned water may be transported back to separator tower 200 for further processing. In another embodiment, cleaned water may be processed by one or more second separation towers, which are similar to or different from separator tower 200. In some embodiments, the cleaned water may be recycled to the aeration module 10, or different aeration modules. In addition, cleaned water may be processed by one or more other treatment methods, such as passing the cleaned water through an activated carbon filter. A person having ordinary skill in the art will understand many of ways of further processing the contaminated water by one or more of the components of the water decontamination system as described herein or other decontamination processes, such as municipal treatment processes.

Contaminated Gas Phase Treatment Systems

In some embodiments, the contaminated gas phase is transferred to a contaminated gas phase treatment system 201. In one embodiment, the liquid decontamination system comprises one or more contaminated gas treatment systems 201, 202. The one or more contaminated gas treatment systems may reduce the levels of contaminants in the contaminated gas. In one embodiment, the contaminated gas phase is transferred from the aerator module 10 to the contaminated gas phase treatment system 201. In another embodiment, the contaminated gas phase is transferred from the separator tower 200 to the contaminated gas phase treatment system 201. In some embodiments, the contaminated gas phases from the separator tower 200 and the aerator module 10 are transferred to the contaminated gas phase treatment system 201. This transfer may occur at the same time, which causes the contaminated gas phases from the aerator module 10 and the separator tower 200 to mix prior to treatment. However, these contaminated gas phases may be treated separately by one or more treatment systems.

In certain embodiments, the contaminated gas phase is treated so that a gas phase comprising substantially no contaminants can be released to the environment. The contaminants from the contaminated gas phase may be trapped or transformed into other compounds which are safe to release into the environment. In one embodiment, the treated gas phase can be reused in one or more components of the liquid decontamination system.

In one embodiment, the contaminated gas phase treatment system 201 is configured to remove or change the gas phase contaminants from other gases which can be expelled from the system as exhaust. In some embodiments, the gas phase contaminants are oxidized. In one embodiment, the contaminated gas phase contaminants are converted into carbon dioxide and water.

The oxidized contaminants may then be released to the atmosphere. In another embodiment, the gas phase contaminants are condensed. Other process gases, such as the remaining dilution air, as well as other environmentally safe compounds, may be released to the atmosphere. In another embodiment, the gas phase contaminants are adsorbed. The remaining dilution air and nonadsorbed gases may be released to the atmosphere. Furthermore, the contaminated gas phase may be subjected to one or more treatment systems to rid the contaminants from the gas phase.

The one or more contaminated gas phase treatment systems 201 may vary according to the contaminants. Suitable contaminated gas phase treatment systems include, but are not limited to, one or more of electric catalytic oxidizer (see FIG. 12), thermal oxidizers, adsorption filtration systems (see FIG. 13) including carbon, zeolite, and polymer adsorption filtration systems, condensers (see FIG. 14), flame oxidizers, cryogenic treatment processes, gas cooling and liquefaction processes, regenerative thermal oxidizers, and rotary concentrators. Some of these treatment systems are further described herein.

Some contaminated gas phase treatment systems 201 may be limited in the amount or rate of gaseous contaminants that it receives and/or treats. In addition, the amount of exhaust which may be released is often determined by environmental regulations governing compounds in the exhaust. Similarly, such contaminated gas phase treatment systems 201 may also be limited in the release of byproducts of such treatment processes to the atmosphere. To regulate the amount and concentration of contaminants subjected to treatment in the contaminated gas phase treatment system 201, the flow rates of the contaminated gas phase may be controlled.

For example, the amount of dilution air received with the contaminants may be controlled. As described above, the dilution air may be mixed with the contaminated gas phase in the separator tower module 200. However, the dilution air may also be mixed with the contaminated gas phase outside of the separator tower 200. In some embodiments, the treatment system 201 may require additional dilution air to process the contaminated gas phase. In such instances, the treatment system 201 may signal the dilution air valve 415 to allow an increase of dilution air to enter the contaminated gas phase. Such signaling may occur manually or automatically based on a programmable logic control in the control panel.

In some embodiments, the contaminated gas treatment system 201 may detect an amount or concentration of contaminant which exceeds that allowed by regulation. Exceeding such levels may require further dilution or shut down the liquid decontamination system. In one embodiment, one or more components of the liquid decontamination system may discontinue the further processing of one or more of the contaminated gas, contaminated liquid, purified gas, dilution air, or the decontaminated liquid. In some embodiments, the cease of one or more of the aforementioned components, may allow the treatment system to reduce the levels of contaminants. When the system detects that one or more of the contaminants has reached a designated and/or safe level, or a level prescribed by environmental laws, then the system may optionally restart one or more components of the liquid decontamination system.

Several examples of certain treatment systems are described below:

Electric Catalytic Oxidizer

Some liquid decontamination systems as described herein comprise a catalytic oxidizer module. In some embodiments, the catalytic oxidizer is an electric catalytic oxidizer 100. In some embodiments, the catalytic oxidizer module 100 may receive a contaminated gas phase from the separator tower 200. In some embodiments, the catalytic oxidizer module receives a contaminated gas phase from the aerator module 10. In certain embodiments, the catalytic oxidizer module 100 receives more than one contaminated gas phase, including the contaminated gas phases from the aerator module 10 and the separator tower 200. This process may remove up to 99.99% of the targeted contaminants and produce exhaust that may be released to the environment.

Figure 12:
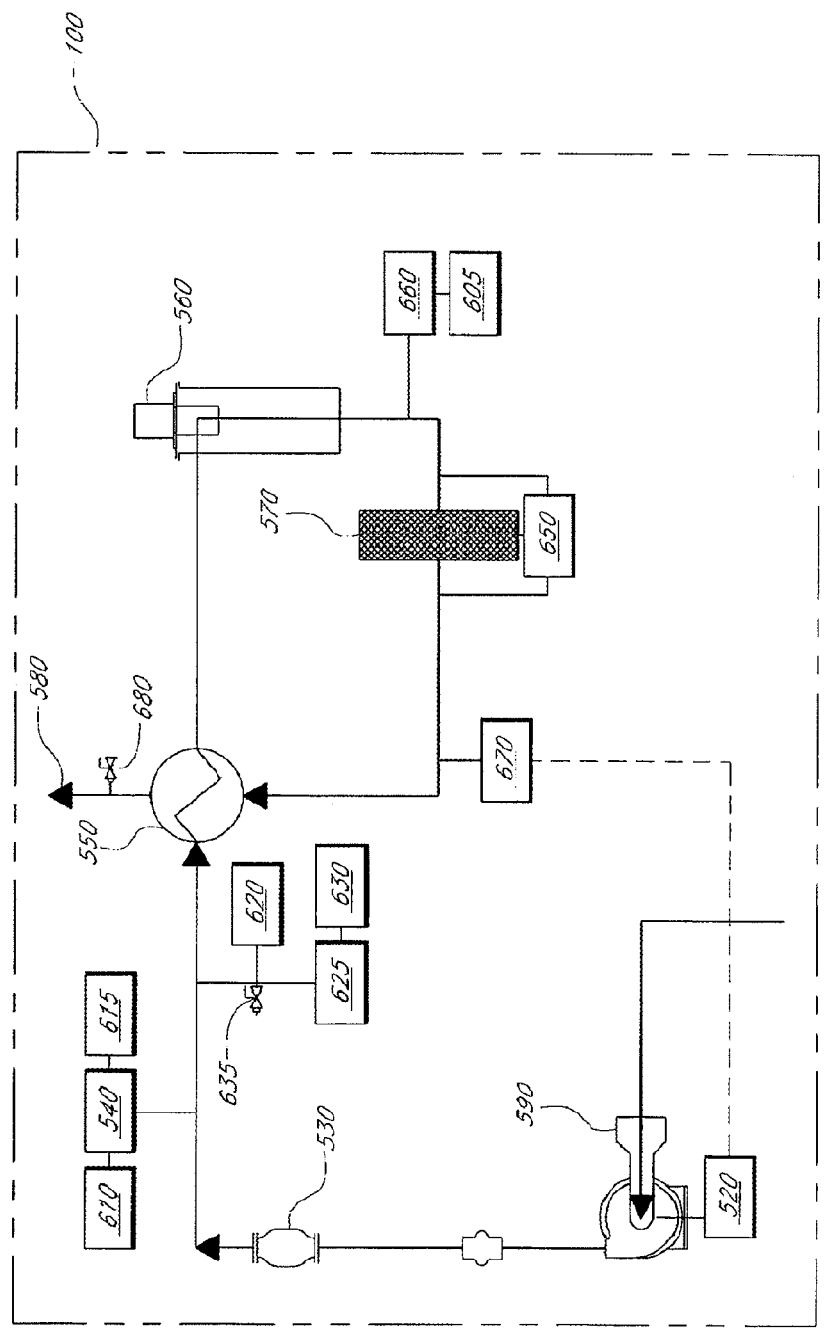
FIG. 12 is a schematic drawing of a catalytic oxidizer module

Embodiments of catalytic oxidizers may vary. Referring to FIG. 12, some embodiments of catalytic oxidizers will include a catalyst 570. Other embodiments include a heater 560 which heats the contaminated gas phase prior to introduction to the catalyst 570. FIG. 12 represents a nonlimiting example of an electric catalytic oxidizer module 100. The electric catalytic oxidizer 100 is equipped with an oxidizer blower 520, flame arrestor 530, pitot tube 540, air to air heat exchanger 550, electric heater 560, catalyst 570 and an exhaust stack 580. The electric catalytic oxidizer 100 is also equipped with pressure switches, temperature switches, and temperature sensors for controlling the process of oxidizing the process gas. The process gas passes through a pipeline 511 to the electric catalytic oxidizer 100. The process gas enters the electric catalytic oxidizer 100 through the null hood 590 at oxidizer blower 520. The null hood 590 may balance the amount of contaminated gas phase and dilution air entering electric catalytic oxidizer 100. In some embodiments, the null hood 590 in conjunction with the oxidizer blower 520 balance the dilution air and process gas to ensure that the temperature of the process gas/dilution air is at the correct temperature at it approaches and as it is treated by the catalyst. Thus, these components may prevent a high temperature alarm 605 in electric catalytic oxidizer 100. In some embodiments, the oxidizer blower blows the process gas and an additional dilution air at flow of up to 200 SCFM, including about 50, 100, and 150 SCFM.

Referring to FIG. 12, flame arrestor 530 prevents flame propagation back to the source of the process gas. Several instruments other instruments are designed to control electric catalytic oxidizer 100. These instruments include one averaging pitot tube 540, one flow indicator 610, one differential pressure transmitter 615, one pressure indicator 620, one pressure switch 625, one pressure alarm 630 and a sample port 635. Averaging pitot tube 540 measures the total flow rate of the process gas. Differential pressure transmitter 615 converts the pressure signal from averaging pitot tube 615 to a milliamp signal. The milliamp signal may be used to determine the flow rate of the process gas. The signal may be fed into the control panel. In addition, the signal may be displayed on a chart recorder. The chart recorder displays the flow rate in standard cubic feet per minute and also records the flow rate.

Referring to FIG. 12, pressure switch 625 monitors the pressure of the process gas entering the oxidizing chamber. If the pressure is not above a preset minimum pressure, pressure switch 625 deactivates and sends a signal to the programmable logic controller in the control panel. The programmable logic controller then shuts down at least part of the process. Pressure gauge 620 indicates process gas pressure entering the oxidizing chamber. Some embodiments may also include a heat exchange 550. Air to air heat exchanger 550 is adapted to pre heat the process gas entering the oxidizing chamber. Air to air heat exchanger 550 uses the hot process gas exiting catalyst 570 to heat the cool process gas entering the tube site of the air to air heat exchanger 550.

As discussed above, electric heater 560 is designed to increase the temperature of the process gas, including the contaminated gas phase. Downstream of electric heater 560 are catalyst 570 and catalyst differential pressure switch 650. The differential pressure switch 650 monitors the pressure drop across catalyst 570. If the pressure drop increases to a pre set differential pressure the switch activates and sends a signal to the programmable logic controller. The programmable logic controller then shuts down at least part of the equipment.

Thermocouple 660 is located on the upstream side of catalyst 570 and measures the process gas temperature entering catalyst 570. If the temperature at thermocouple 660 is too low, electric heater 560 is energized by the control panel. If the temperature at thermocouple 660 is too high, electric heater 560 is de-energized by the control panel. If the temperature at thermocouple 660 reaches a preset high temperature, a signal is sent to the programmable logic controller. The programmable logic controller then shuts down the equipment.

Thermocouple 670 is located on the downstream side of the catalyst 570. Thermocouple 670 monitors the process gas temperature exiting catalyst 570. If the temperature at thermocouple 670 reaches a preset temperature a signal is sent to the programmable logic controller. The programmable logic controller sends a signal to the oxidizer blower 520 to speedup. As oxidizer blower 520 speeds up, more dilution air is pushed into the oxidizing chamber which cools the temperature at thermocouple 670. If the temperature at thermocouple 670 rises to a preset temperature a signal is sent to the programmable logic controller. The programmable logic controller then shuts down the equipment.

The gas which has been processed by the catalyst may exit the catalytic oxidizer 100 at exhaust stack 580. In some embodiments, exhaust stack 580 is equipped with a sample port 680, which is used to collect effluent gas samples. In some embodiments, exhaust stack 580 vents the hot process gas to atmosphere. In other embodiments, exhaust stack 580 recycles the processed gas to the water decontamination system.

Each catalytic oxidizer may have different conditions which produce the best result. These conditions likely depend on variables such as the type of catalyst, the flow rate, temperature, the particular contaminants, and the concentration of the contaminated gas.

One nonlimiting example of the electric catalytic oxidizer that can be used is the CCC SRCO 250E, available from Catalytic Combustion (Drewelow Remediation Equipment, Inc.). In this example, the contaminated gas phase which passes through the catalyst bed at a temperature of about 650° F. (343° C.).

Condenser System

One method of treating a contaminated gas phase includes condensing the gas phase contaminants. In some embodiments, the water decontamination system includes a condenser system. As discussed above, the condenser system may comprise a condenser that is air cooled or water cooled. In some embodiments, the condenser system comprises a condenser that is cooled by the contaminated water. In these embodiments, heat generated from the condensation of the contaminated gas phase may be exchanged with the contaminated water.

In some embodiments, the condenser system is adapted to condense one or more of 1,1,1-trichloroethane, 1,1,2,2-tetrachloroethane, 1,1,2-trichloroethane, 1,1,2-trichlorotrifluoro ethane, 1,1-dichloroethane, 1,1-dichloroethene, 1,2,3-trimethylbenzene, 1,2,4-trichlorobenzene, 1,2,4-trimethylbenzene, 1,2-dibromoethane, 1,2-dichlorobenzene, 1,2-dichloroethane, 1,2-dichloropropane, 1,2-dichlorotetrafluoroethane, 1,3,5-trimethylbenzene, 1,3-dichlorobenzene, 1,4-dichlorobenzene, 2,3-dimethylpentane, 2,4-dimethylpentane, acetone, alpha-pinene, benzene, bromomethane, carbon tetrachloride, chlorobenzene, chloroethane, chloroform, chloromethane, cis-1,2-dichloroethene, cis-1,3-dichloropropene, cycloheptane, cyclohexane, dichlorodifluoromethane, d-limonene, ethyl alcohol, ethylbenzene, ethylcyclohexane, ethylmethacrylate, hexachloro-1,3-butadiene, iso-octane, isoprene, isopropylbenzene, m,p-xylene, methyl ethyl ketone, methyl isobutyl ketone, methylcyclohexane, methylene chloride, methylmethacrylate, methyl-tert-butyl ether, n-butylbenzene, n-decane, n-dodecane, n-heptane, n-hexane, n-nonane, n-octane, n-propylbenzene, n-undecane, o-xylene, sec-butylbenzene, styrene, tert-butylbenzene, tetrachloroethene, tetrahydrofuran, toluene, trans-1,3-dichloropropene, trichloroethene 400 trichlorofluoromethane, vinyl chloride, and other volatile organic compounds.

Figure 13:
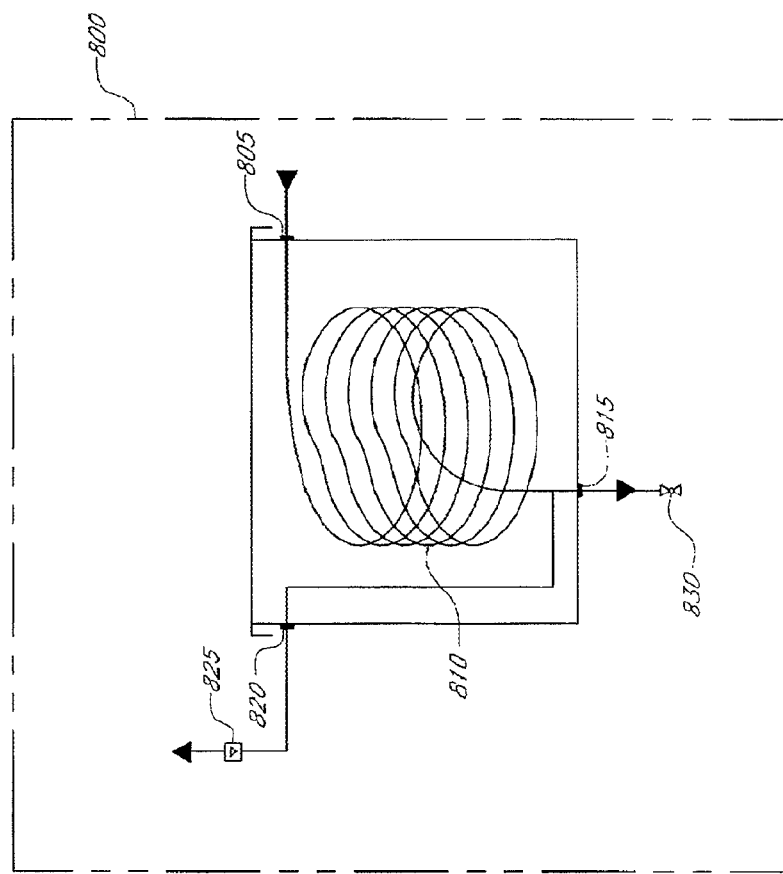
FIG. 13 is a schematic drawing of a condenser system.

Referring to FIG. 13, the condenser system 800 may be equipped with one or more of a contaminated gas influent connection 805, condenser 810, contaminated liquid effluent connection 815, clean air effluent connection 820 and clean air flow meter 825. The process gas enters the condenser system 800 at influent connection 805. As the contaminated gas phase passes through condenser 810, at least some contaminants condense into concentrated liquid contaminants. The liquid contaminants may be removed from the condenser 810 at effluent connection 815.

Ball valve 830 may be left open to continuously allow the condensed contaminants to be removed from the condenser system 800. Alternatively, ball valve 830 may be closed to allow for the contaminants to collect in the condenser 810. In some embodiments, cleaned air may be vented from the condenser 810. This cleaned air may exit the condenser at cleaned air effluent connection 820 and be captured or vented to the atmosphere. Cleaned air may alternatively be recycled in one or more components of the liquid decontamination system. Such exit of the cleaned air may be monitored by cleaned air flow meter 825.

Described above is one nonlimiting example of a condenser system. A person having ordinary skill in the art the skilled artisan will recognize the interchangeability of various features from different embodiments with the condenser system described and other available condenser systems.

A liquid decontamination system including at least one aerator module 10, at least one separator tower 200, and at least one condenser system 800 may be particular suited for applications which recover fuel and other volatile contaminants from water. Such fuel or other contaminants may then be recycled into various processes in which it was produced. For example, ships and other marine vehicles often collect bilge water. The bilge is the compartment at the bottom of the hull of a ship or other marine vessel where water collects so that it may be pumped out of the vessel at a later time. Bilge water often includes fuel and other volatile organic contaminants. By employing a liquid decontamination system, which includes a condenser system, the fuel and other volatile organic contaminants may be recovered. Such fuel and other contaminants could then be recycled as fuel for the ship or marine vessel.

Adsorption Filter

Figure 14:
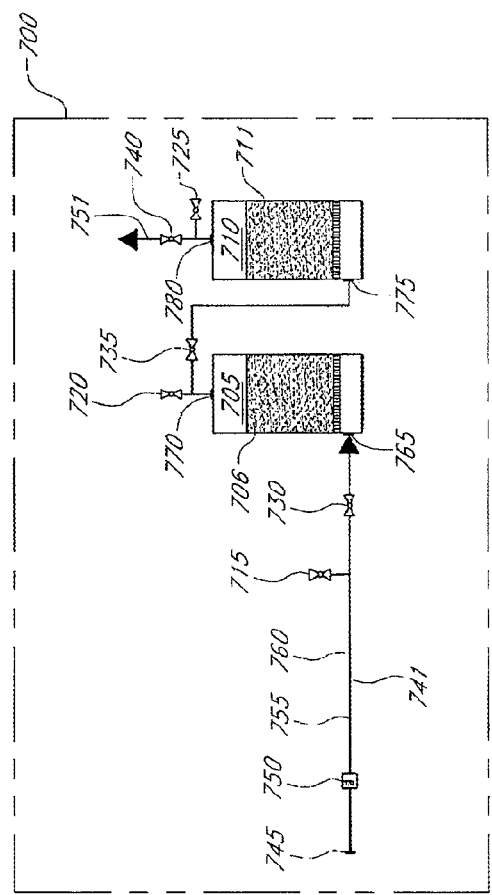
FIG. 14 is a schematic drawing of an adsorption filtration system.

As discussed above, water decontamination systems as described herein may include an adsorption filter 700 which treats the contaminated gas phase. Suitable adsorption filter systems include, but are not limited to, activated carbon filtrations systems, zeolite filtration systems, and polymer filtration systems. Referring to FIG. 14, in some embodiments, the adsorption system 700 may receive a contaminated gas phase from the separator tower 200. In some embodiments, the vacuum pump 510 delivers the contaminated gas phase to the adsorption system 700. In some embodiments, the adsorption system 700 receives a contaminated gas phase from the aerator module 10. In certain embodiments, the adsorption filtration system 700 receives more than one contaminated gas phase, including the contaminated gas phases from the aerator module 10 and the separator tower 200.

In one embodiment, the adsorption filtration system 700 comprises an activated carbon filter that is suitable for removing contaminants from liquids. In some embodiments, the activated carbon filtration system is particularly suited for removing certain contaminants from water.

In some embodiments, the adsorption filtration system comprises one or more adsorption vessels 705, 710. In particular embodiments, these adsorption vessels 705, 710 are activated carbon vessels. Such carbon vessels may be gas phase carbon vessels as gaseous contaminants are being purified in the vessel. In some embodiments, the gas phase contaminants may be first condensed and then purified through such adsorption vessels 705, 710.

The adsorption vessels may be selected based on the contaminant to be purified from the liquid and gas phase. Additionally, the vessels may be selected based on the desired flow rates of the overall process. In one example, an activated carbon vessel may be selected based on at least one contaminant, such as aromatic hydrocarbons or halogenated organic compounds to be removed. In some embodiments, the activated carbon filtration system is adapted to adsorb vinyl chlorides, 1,2-dichloroethane, carbon tetrachloride, trichloroethylene, tetrachloroethylene, 1,1-dichloroethane, chloroform, 1,1,1-trichlorooethane, 1,1,2-trichloroethane, and combinations thereof. In other embodiments, the activated carbon filtration system is adapted to adsorb certain VOCs.

In some embodiments, the adsorption system can remove volatile organic compounds from the contaminated gas stream as the contaminated gas is passed over the adsorption filter. One method of treating a contaminated gas phase from either the separator tower 200 or the aerator module 10 includes adsorbing the contaminants by activated carbon adsorption. In some embodiments, the liquid purification system comprises an activated carbon filtration system. The activated carbon filtration system may comprises one or more vapor phase carbon vessels, including, but not limited to two, three, four, and five carbon vessels. Contaminated gas phases are passed through the vapor phase carbon vessels.

Referring to FIG. 14, the adsorption filtration system 700 may include two purification vessels 705, 710, three sample ports 715, 720, 725 three manual ball valves 730, 735, 740 and an exhaust stack. The process gas passes through a pipeline 741 to the adsorption filtration system 700. The process gas may enter the adsorption filtration system 700 through the process gas influent connection 745. Averaging pitot tube 750 measures the total flow rate of the process gas being treated by the adsorption filtration system 700. Temperature gauge 755 measures the temperature of the process gas being treated. Pressure gauge 760 measure the pressure of the process gas being treated. Sample port 715 is used to collect a process gas sample prior to treatment.

Adsorption vessels 705, 710 may be used to treat the process gas. Such process gas enters adsorption vessels 705, 710 through influent connections 765, 775. In the described embodiment, influent connections 765, 775 is located near the bottom of adsorption vessels 705, 710. The process gas flows up through the adsorption medium 706, 711 such as activated carbon, and the adsorption medium adsorbs the contaminants in the process gas. The process gas exits adsorption vessel 705, 710 at the effluent connections 770, 780. In this embodiment, effluent connections 770, 780 are located near the top of adsorption vessels 705, 710. Sample port 720 is used to collect a process gas sample after treatment by the primary adsorption vessel 705. Ball valves 730 and 735 allow for servicing of primary adsorption vessel 705.

Optionally, secondary adsorption vessel 710 may be used to further purify the contaminated gas phase that exits adsorption filter 705. Ball valves 735 and 740 allows for servicing of secondary carbon vessel 710. Downstream of effluent connection 780 is the exhaust stack 751. The exhaust stack 751 may be equipped with a sample port 725. The purified gas phase may then exit exhaust stack 751 to the environment or be recycled to the water decontamination system.

Examples of suitable activated carbon filters and vessels suitable for use in the liquid purification system include, but are not limited to, the MX-200-V available from Barnebey Sutcliffe, the AP3-60 and AP4-60 available from the Calgon Carbon Corporation. In some embodiments, the activated carbon may be activated charcoal. In some embodiments, the activated carbon has a minimum hardness number ranging from about 60 to about 120, and more preferably about 90. The density of the activated carbon may range from about 300 to about 600. In other embodiments, the density of the activated carbon may range from about 400 to about 500, and more preferably about 450 to about 500. In most cases, the activated carbon has a moisture content that is no greater than 5 wt %.

Dual Phase

Water decontamination systems as described herein may also be used in a dual phase capacity. Often, a contaminated source of ground water will also include gaseous contaminants. Such contaminants may also be processed by the liquid decontamination systems and removed by the contaminated gas treatment system. In one embodiment, the gaseous contaminants are extracted from the ground or the soil and enter the aerator module. Such contaminants may pass directly to the headspace of the aerator tank and transferred to the contaminated gas treatment system. However, some embodiments may include a sensor which may recognize the gaseous contaminants which are being extracted from the ground or soil. Such sensor may then operate a valve that allows the gaseous contaminants to pass directly to the contaminated gas treatment system.

Mounting Configuration

The liquid decontamination system may be mounted one or more platforms. In one embodiment, each module of the water decontamination system is mounted on a separate skid.

In such an embodiment, the user could choose the components and allocate each component to the desired location. However, in some embodiments, it is advantageous to mount all of the modules on one platform.

Figure 15:
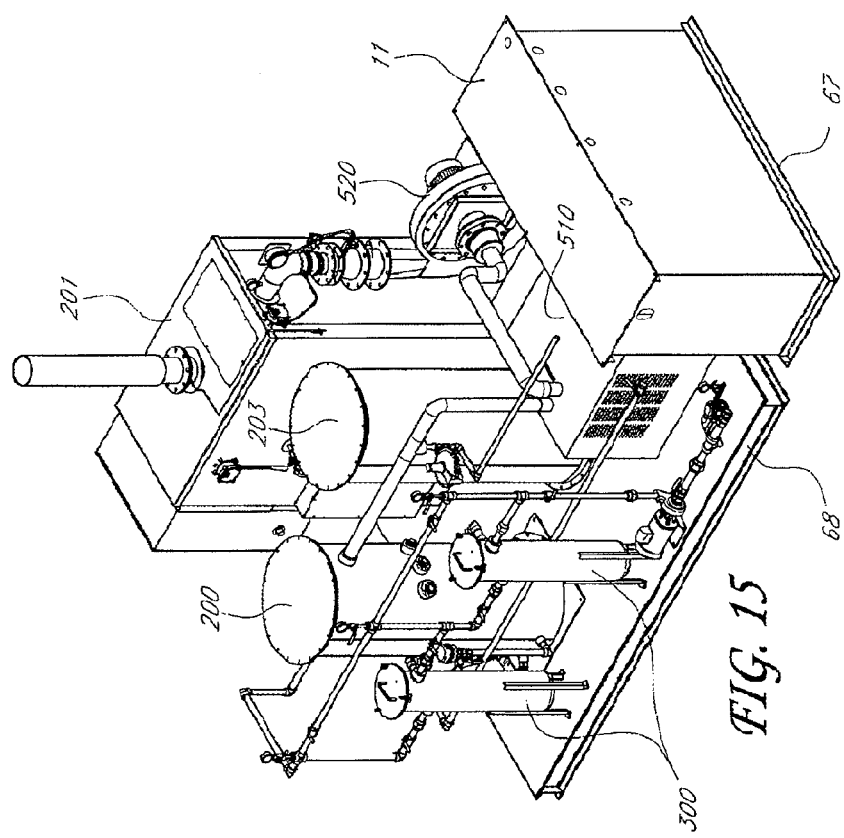
FIG. 15 is schematic drawing of a liquid decontamination system in one configuration.
Figure 16:
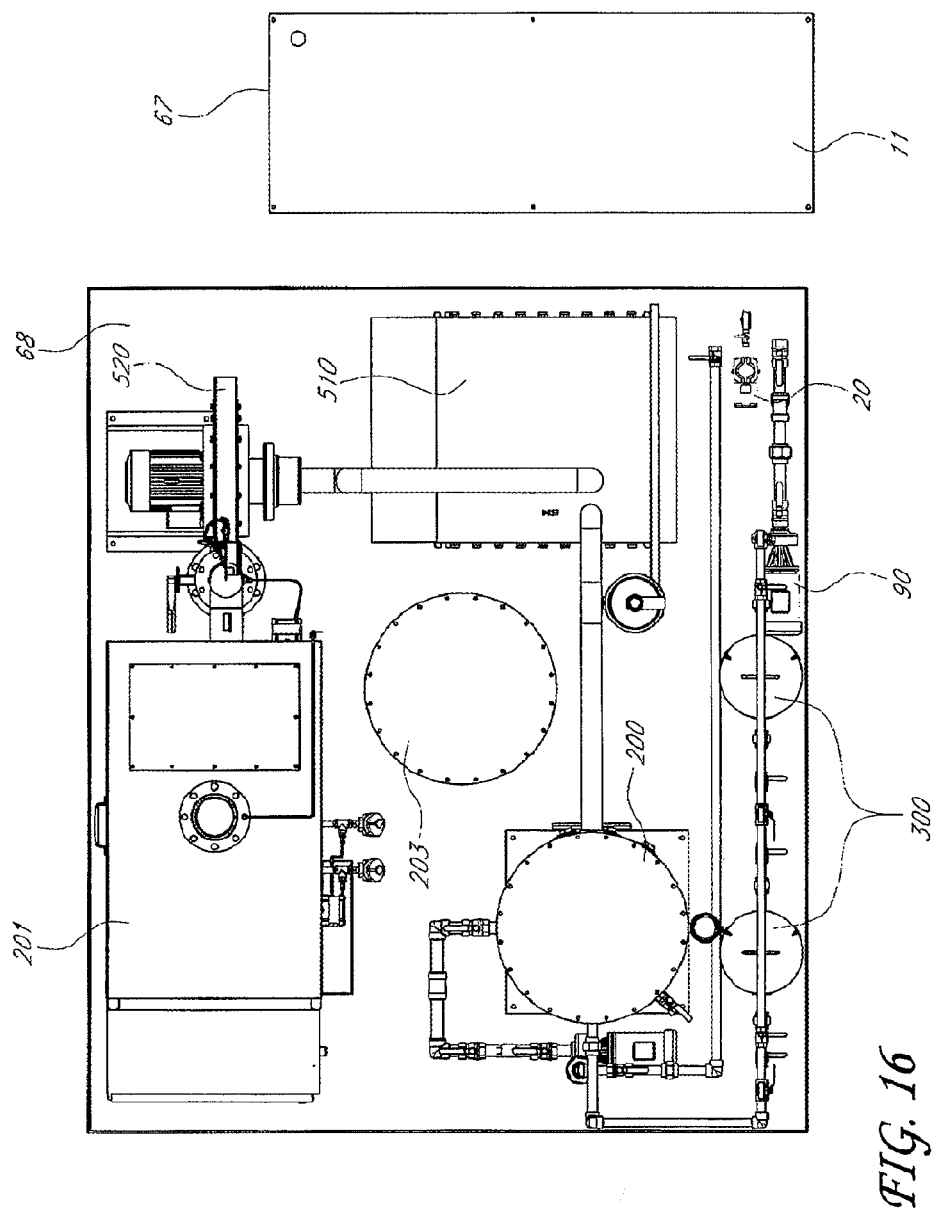
FIG. 16 is a top view of a liquid decontamination system in one configuration.

One example of a configuration is shown in FIGS. 15 and 16. In these figures, aerator tank 101 is mounted on a first skid 67. Filtration module 300, separator tower 200, and contaminated gas treatment system 201 are mounted on a second skid 68. Additionally, the second skid includes water transfer pump 90, vacuum pump 510, compressor 20. As is noted in the Figures, separator tower module may include two separator towers 200 and 203. Alternatively, separator tower 203 may be mounted on separator tower 200. As is shown, separator tower 203 may be removed for ease of transportation of the skid 68.

Manual or Automated Control

As is stated throughout the description, one or more processes and/or components may be controlled manually or automatically. Various valves, pressure gauges, temperature gauges, and pump controls allow a user to manually determine the conditions of operation of the water decontamination system. In some embodiments, it is preferable that these processes are controlled automatically. For example, one or more of the processes may be controlled from a control panel. In some embodiments, the control panel comprises one or more programmable logic controllers. Each controller may be designated certain processes to monitor, adjust, activate, or deactivate depending on preprogrammed settings and conditions. Modes of controlling these processes automatically will be understood by a person having ordinary skill in the art.

Unless otherwise indicated, the term "processing logic controller" is a broad term and is used in its ordinary sense and includes, without limitation, wherein the context permits, one or more steps, one or more groups, one or more programs, one or more instructions, and one or more processors. It may also refer to logic embodied in hardware or firmware, or to a collection of software instructions, possibly having entry and exit points, written in a programming language, such as, for example, C or C++. A processing module may be compiled and linked into an executable program, installed in a dynamic link library, or may be written in an interpreted programming language such as, for example, BASIC, Perl, or Python. It will be appreciated that processing modules may be callable from other modules (such as an input module) or from themselves, and/or may be invoked in response to detected events or interrupts. It will be further appreciated that processing modules may be comprised of connected logic units, such as gates and flip-flops, and/or may be comprised of programmable units, such as programmable gate arrays or processors.

EXAMPLES & TESTING

Figure 17:
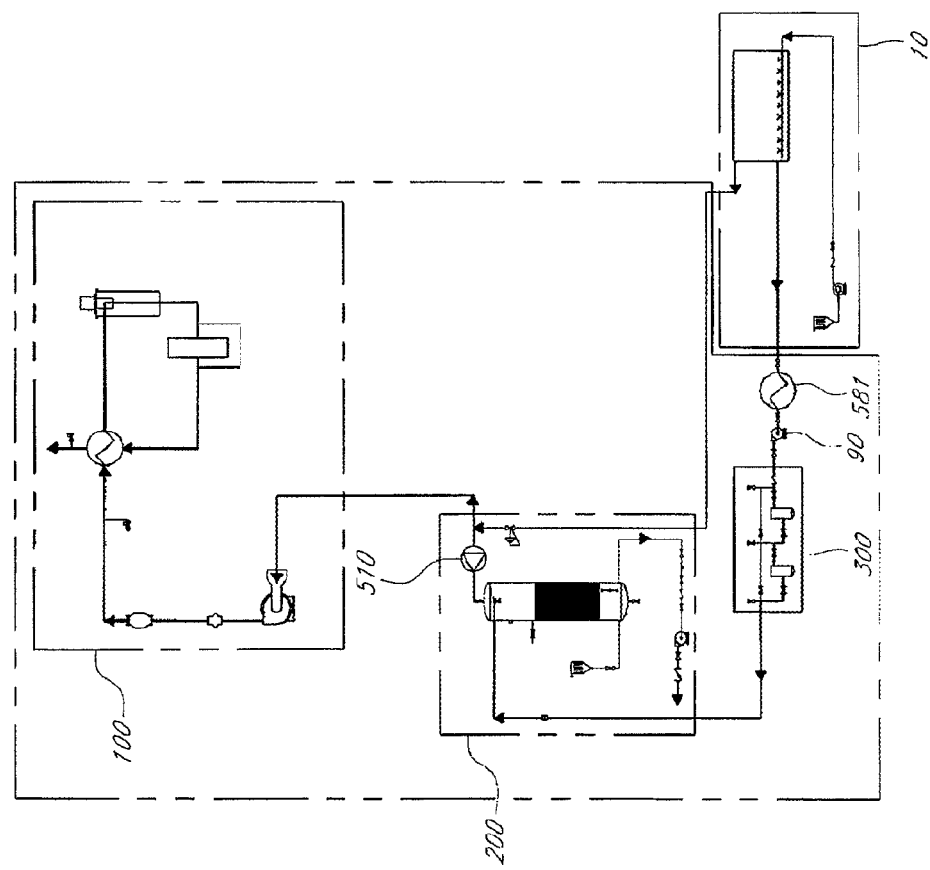
FIG. 17 is one embodiment of a liquid decontamination system that was built and tested.

Referring to FIG. 17, a liquid decontamination system was built and tested. This system included an aerator module 10, a liquid transfer pump 90, filtration system 300, separator tower 200, vacuum pump 510, an electric catalytic oxidizer 100. Additionally, a heat exchanger 581 was installed to transfer heat from liquid transfer pump 90 to the contaminated water prior to entering the separator tower 200. All of these components are herein described.

Samples of contaminated water were tested. These samples contained various contaminants, such as VOCs. The samples were then purified using the liquid decontamination system. Samples were introduced at the liquid influent connection point on the aerator module 10. Between samples, uncontaminated water was run through the liquid decontamination system for several hours.

The operation conditions of the water decontamination system were varied to determine the appropriate conditions for purifying the various contaminants in the water. One or more of the water flow rate, water pressure, water temperature, nozzle pressure, separator tower vacuum pressure, separator tower temperature, and dilution air flow rate can be varied to adjust for certain contaminants and field conditions.

In some embodiments, the liquid purification system as described herein operates to produce about 10 gallons per minute of the purified liquid. However, the liquid purification system can be configured and/or scaled to produce more or less than 10 gallons per minutes, depending on the application and/or contaminants.

The samples were tested under the operation conditions described in Table 1.

TABLE 1

| | Operational Conditions | | | | | | |
|---|---|---|---|---|---|---|---|
| Sample No. | Water Flow Rate (gpm) | Water Pressure (PSIG) | Water Temperature (° F.) | Nozzle Pressure (PSIG) | Separator Tower Vacuum (Inches of Hg) | Separator Tower Temp. (° F.) | Dilution Air Flow Rate (SCFM) |
| 1 | 9.52 | 122 | 70 | 120 | 27 | 70 | 8 |
| 2 | 9.21 | 56 | 85-86 | 57 | 27 | 83 | 8 |
| 3 | 7.2 | 62 | 85-90 | 62 | 27 | 83-86 | 8 |
| 4 | 8.4-9.3 | 26-36 | 88-92 | 22-26 | 26.5-28.0 | 87-90 | Variable |
| 5 | 8.1-8.2 | 61 | 77-78 | 58 | 27.1 | 78-79 | 8 |
| 6 | 8.1-8.2 | 61 | 77-78 | 58 | 27.1 | 79-79 | Variable |

The samples which were introduced to the liquid decontamination system were tested to determine the initial concentration of contaminants in the sample. This is referred to as the "Influent" concentration in the following tables. After introduction of the sample to the liquid decontamination system, further aliquots were taken at different points to determine the effectiveness of the various components of the liquid decontamination system. A "Midpoint" aliquots were taken immediately following the aeration tank to determine the efficiency of the aerator module 10. "Effluent" aliquots were taken after the water was removed from the sump of the separator tower. In addition, Samples 4 & 6 presents data that describes the change in effectiveness of the contaminants based on the dilution air flow rate. Note that some of the data presented in the tables is given in terms of "<" (less than) some value because of the detection limits of the GC-MS testing device.

The following Tables 2-7 details the results of the testing:

TABLE 2

Sample 1

| Compound | Influent (μg/l) | Midpoint (μg/l) | Effluent (μg/l) | % removed |
|---|---|---|---|---|
| Benzene | 7200 | 387 | 106 | 98.53 |
| Ethyl benzene | 18700 | 1430 | 330 | 98.24 |
| Toluene | 43100 | 4930 | 957 | 97.78 |
| Total Xylenes | 68100 | 5620 | 1520 | 97.77 |
| MTBE | 178000 | 6360 | 3770 | 97.88 |
| TBA | 13600 | 611 | <10 | 99.93 |
| Gasoline | 1280000 | 52000 | 24900 | 98.05 |

TABLE 3

Sample 2

| Compound | Influent (μg/l) | Midpoint (μg/l) | Effluent (μg/l) |
|---|---|---|---|
| Benzene | 1060 | 70 | 8.2 |
| Ethyl Benzene | 3950 | 226 | 19 |
| Toluene | 15500 | 984 | 74 |
| Total Xylenes | 23400 | 1740 | 123 |
| MTBE | 10700 | 1120 | 361 |
| Gasoline | 728000 | 12500 | 1890 |

TABLE 4

Sample 3

| Compound | Influent (μg/l) | Midpoint (μg/l) | Effluent (μg/l) |
|---|---|---|---|
| Benzene | 1580 | 26 | 5.8 |
| Ethyl Benzene | 2940 | 367 | 81 |
| Toluene | 15700 | 832 | 147 |
| Total Xylenes | 15700 | 2330 | 563 |
| MTBE | 14800 | 919 | 320 |
| Gasoline | 90400 | 9590 | 4000 |

TABLE 5

Sample 4

| Compound | Influent (μg/l) | Midpoint (μg/l) | Effluent @ 2 SCFM (μg/l) | Effluent @ 4 SCFM (μg/l) | Effluent @ 8 SCFM (μg/l) |
|---|---|---|---|---|---|
| Benzene | 2600 | <20 | <20 | <10 | <10 |
| Ethylbenzene | 8280 | <100 | <100 | <50 | <50 |
| Toluene | 27100 | 115 | <100 | <50 | <50 |
| 1,2,4-Trimethylbenzene | 20600 | 635 | 229 | 170 | 166 |
| 1,3,5-Trimethylbenzene | 5750 | <100 | <100 | <50 | <50 |
| Total Xylenes | 44400 | 642 | <100 | 68 | <50 |
| MTBE | 11900 | 294 | 76 | 47 | 20 |
| Gasoline | 10500 | 9900 | 1580 | 699 | 67 |
| 1-Chlorohexane | 16200 | 204 | <100 | <50 | <50 |
| 2-Chloroethyl vinyl ether | 9070 | <100 | <100 | <50 | <50 |

TABLE 6

Sample 5

| Compound | Influent (μg/l) | Midpoint (μg/l) | Effluent (μg/l) |
|---|---|---|---|
| Benzene | 8700 | <50 | <10 |
| Ethylbenzene | 14100 | 221 | 43 |
| MTBE | 158000 | 1100 | 248 |
| Toluene | 50600 | 414 | 235 |
| Total Xylenes | 48900 | 1100 | 238 |
| Gasoline | 292000 | 11200 | 4160 |

TABLE 7

Sample 6

| Compound | Influent (μg/l) | Midpoint (μg/l) | Effluent (μg/l) | Effluent @ 2 SCFM (μg/l) | Effluent @ 4 SCFM (μg/l) | Effluent @ 8 SCFM (μg/l) |
|---|---|---|---|---|---|---|
| Benzene | 7300 | 136 | <50 | <50 | <50 | <50 |
| Ethylbenzene | 5000 | 222 | 68 | 60 | 55 | <250 |
| MTBE | 228000 | 3100 | 1270 | 1130 | 730 | 472 |
| Toluene | 28700 | 854 | 163 | 166 | 120 | <250 |
| Total Xylenes | 17400 | 924 | 318 | 329 | 318 | 264 |
| Gasoline | 650000 | 10900 | 2560 | 3090 | 2980 | 2490 |

According to the data, the liquid decontamination system substantially reduces the amount of contaminants in the contaminated water samples. Specific contaminants may be removed in greater amounts by varying the conditions of the liquid decontamination system. Furthermore, in all of the samples, cleaned exhaust was released to the environment in conformance with environmental regulations.

Figure 18:
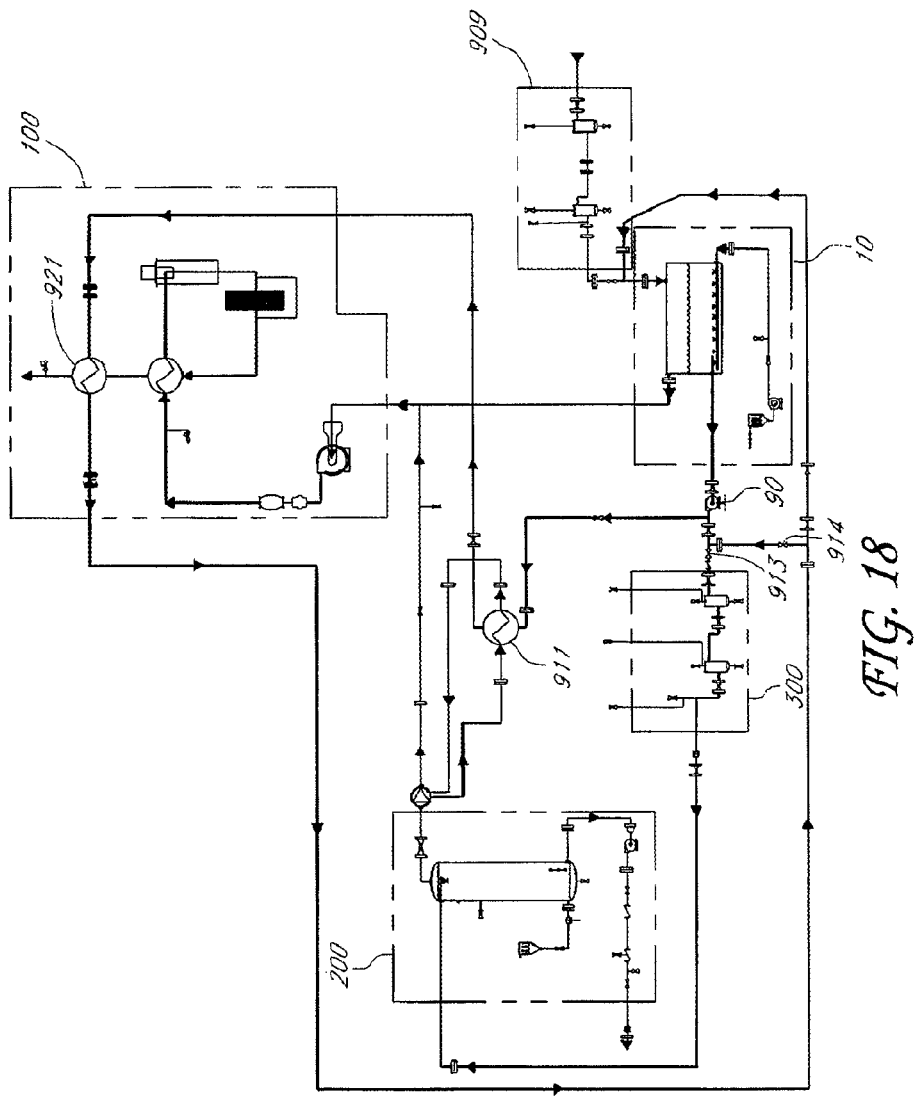
FIG. 18 is a schematic drawing of another configuration of a liquid decontamination system.

Other examples of water decontamination systems are described herein. Yet another example is the water decontamination system of FIG. 18. In this embodiment, contaminated water passes through a first filtration system 909. This prevents solid particles from entering aerator module 10 or any other component of the water decontamination system. The contaminated water then enters aeration module 10 and is decontaminated according to processes described above. As the water may not be at the selected temperature for decontamination, the water may pass through the aeration module 10. In some embodiments, the system does not purify the water which is not at the selected temperature. In other embodiments, the water is decontaminated in the aerator module even at temperatures less than the selected temperature.

As water is transferred from the aeration module 10 by liquid transfer pump 90, the water may be directed to filtration system 300. Alternatively, if the water is not at a selected temperature, the water may be transferred and/or processed by heat exchanger 911. This may be accomplished manually or automatically. For example, this may be accomplished by solenoid 913 which may automatically direct water to heat exchanger 911. Heat exchange 911 exchanges heat from the vacuum pump with the contaminated water. In some embodiments, the contaminated water may then be transferred back to one or more components of the water decontamination system for further purification. For example, after passing through heat exchange 911, the heated, contaminated water may pass back through filtration system 300 or back to aerator module 10.

In another embodiment, the contaminated water may pass through heat exchanger 921 of the electric catalytic oxidizer 100, or more generally, a heat exchanger 921 of the contaminated gas treatment system 201. In one embodiment, and as illustrated in FIG. 14, the contaminated water may pass through heat exchanger 911 and heat exchange 921, prior to passing back to one or more components of the liquid decontamination system, such as the aerator module 10, the filtration system 300, or the separator tower 200. By allowing the water to pass through both heat exchangers, the water is heated more efficiently during the decontamination process.

After sufficient heating, solenoid valve 913, 914 may redirect water to the aerator module or the filtration module. As water exits aeration module at or above the selected temperature ranger, the water may then flow through filtration system 300 and onto the separator tower 200. The contaminated water may then be further purified by removal of the contaminants into a contaminated gas phase. This contaminated gas phase may then be further purified through a contaminated gas phase treatment system such as the electric catalytic oxidizer 100.

The various methods and techniques described above provide a number of ways to carry out the invention. Of course, it is to be understood that not necessarily all objectives or advantages described may be achieved in accordance with any particular embodiment described herein.

Furthermore, the skilled artisan will recognize the interchangeability of various features from different embodiments. Similarly, the various features and steps discussed above, as well as other known equivalents for each such feature or step, can be mixed and matched by one of ordinary skill in this art to perform methods in accordance with principles described herein.

Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of preferred embodiments herein.

The invention claimed is:

1. An apparatus for reducing levels of contaminants in a contaminated liquid comprising a tank, wherein the tank comprises:
   an inlet for introducing a contaminated liquid to the tank;
   an outlet for outputting an output liquid having less contaminants than the contaminated liquid,
   a lid for preventing gaseous contaminants from the contaminated liquid to escape to an atmosphere surrounding the tank;
   a plurality of first and second partitions disposed between the inlet and the outlet, each of the first partitions extending from the lid to a first level above a bottom of the tank, and each of the second partitions extending from the bottom of the tank to a second level below the lid of the tank, the plurality of first and second partitions forming a plurality of chambers through which the contaminated liquid flows;
   a vent positioned between the second level and the lid for removing the gaseous contaminants;
   a vacuum source connected to the vent; and
   at least one gas output configured to deliver a gas to a contaminated liquid located within each chamber of the tank.

2. The apparatus of claim 1, further comprising at least one float switch within the chamber having the outlet, the float switch operationally connected to the outlet for opening and closing a valve which allows for removal of the output liquid from the tank.

3. The apparatus of claim 1, wherein the plurality of chambers forms a sinuous path for the contaminated water as it travels between the chamber having the inlet to the succeeding chambers.

4. The apparatus of claim 1, further comprising an inlet flow regulator for regulating the input rate of the contaminated water into the inlet and an outlet flow regulator for regulating the output rate of the output water into the outlet.

5. The apparatus of claim 1, wherein the at least one gas output comprises a gas diffuser.

6. The apparatus of claim 1, wherein at least one of the chambers of the plurality of chambers is a counter-current flow chamber, such that the contaminated water flows downward in the chamber from a position above the at least one gas output located the chamber.

7. The apparatus of claim 1, wherein two or more chambers of the plurality of chambers are counter-current flow chambers, such that the contaminated water flows downward in each chamber from a position above the at least one gas output located in the chambers.

8. The apparatus of claim 1, wherein the tank further comprises at one current flow chambers having an opening in a partition which allows contaminated water to enter the current flow chamber at a level approximate to or below the level of the at least one gas output located in the chamber.

9. An apparatus for reducing levels of contaminants in a contaminated liquid, the apparatus comprising a tank, wherein the tank comprises:
   a headspace connected to a vacuum source;
   at least one countercurrent flow chamber having a first inlet side, a first outlet side, and a gas source output for delivering gas to a contaminated liquid, and
   at least one current flow chamber in fluid connection with the at least one countercurrent flow chamber, the at least one current flow chamber having a second inlet side and a second outlet side; and
   wherein the distance between the first inlet side and the first outlet side of the countercurrent flow chamber is greater than the distance between the second inlet side and the second outlet side of the current flow chamber.

10. The apparatus of claim 9, wherein the at least one current flow chamber is positioned between two countercurrent flow chambers.

11. The apparatus of claim 9, wherein the at least one countercurrent flow chamber is positioned between two current flow chambers.

12. The apparatus of claim 9, wherein the at least one current flow chamber comprises a gas source output for delivering gas to the contaminated liquid.

13. The apparatus of claim 9, wherein a countercurrent flow chamber is the final chamber in the tank relative to the flow of water through the tank.

14. The apparatus of claim 9, wherein a countercurrent flow chamber is the first chamber in the tank relative to the flow of water through the tank.

15. The apparatus of claim 9, wherein the first and second inlet sides and the first and second outlet sides are configured to create a sinuous flow of water between the at least one countercurrent flow chamber and the current flow chamber.

16. The apparatus of claim 9, further comprising an inlet flow regulator for regulating an input rate of the contaminated water into the inlet and an outlet flow regulator for regulating an output rate of the output water into the outlet.

17. The apparatus of claim 9, wherein the counter current chamber has a larger volume than the current chamber.

* * * * *